United States Patent
Ossowski et al.

(10) Patent No.: US 11,823,679 B2
(45) Date of Patent: *Nov. 21, 2023

(54) METHOD AND SYSTEM OF AUDIO FALSE KEYPHRASE REJECTION USING SPEAKER RECOGNITION

(71) Applicant: Intel Corporation, Santa Clara, CA (US)

(72) Inventors: Jacek Ossowski, Gdansk (PL); Tobias Bocklet, Munich (DE); Kuba Lopatka, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,792

(22) Filed: Jul. 13, 2022

(65) Prior Publication Data

US 2022/0375472 A1 Nov. 24, 2022

Related U.S. Application Data

(63) Continuation of application No. 17/092,737, filed on Nov. 9, 2020, now Pat. No. 11,423,904, which is a continuation of application No. 16/017,030, filed on Jun. 25, 2018, now Pat. No. 10,832,671.

(51) Int. Cl.
*G10L 15/22* (2006.01)
*G10L 15/08* (2006.01)
*G10L 17/00* (2013.01)

(52) U.S. Cl.
CPC .............. *G10L 15/22* (2013.01); *G10L 15/08* (2013.01); *G10L 17/00* (2013.01); *G10L 2015/088* (2013.01); *G10L 2015/223* (2013.01); *G10L 2015/225* (2013.01)

(58) Field of Classification Search
CPC ......... G10L 15/22; G10L 15/08; G10L 17/00; G10L 2015/088; G10L 2015/223; G10L 2015/225
USPC ......................................................... 704/251
See application file for complete search history.

(56) References Cited

U.S. PATENT DOCUMENTS

| | | | |
|---|---|---|---|
| 6,292,778 B1 | 9/2001 | Sukkar | |
| 6,735,562 B1 | 5/2004 | Zhang et al. | |
| 9,183,560 B2 | 11/2015 | Abelow | |
| 9,371,099 B2 | 6/2016 | Lagassey | |
| 9,646,634 B2 | 5/2017 | Sainath et al. | |
| 9,715,660 B2 | 7/2017 | Parada San Martin et al. | |
| 10,304,440 B1 | 5/2019 | Panchapagesan et al. | |
| 10,516,703 B2 | 12/2019 | Peters et al. | |

(Continued)

OTHER PUBLICATIONS

Non-Final Office Action for U.S. Appl. No. 16/017,030, dated Mar. 23, 2020.

(Continued)

*Primary Examiner* — Susan I McFadden
(74) *Attorney, Agent, or Firm* — Essential Patents Group, LLP

(57) ABSTRACT

Techniques related to a method and system of audio false keyphrase rejection using speaker recognition are described herein. Such techniques use speaker recognition of a computer originated voice to omit actions triggered when a keyphrase is present in captured audio and omitted when speech of the captured audio was spoken by the computer originated voice.

25 Claims, 14 Drawing Sheets

(56) References Cited

U.S. PATENT DOCUMENTS

| | | |
|---|---|---|
| 10,529,331 B2 | 1/2020 | Czyryba et al. |
| 10,650,807 B2 * | 5/2020 | Bocklet .................. G10L 15/22 |
| 10,832,671 B2 | 11/2020 | Ossowski et al. |
| 11,423,904 B2 * | 8/2022 | Ossowski ............... G10L 15/08 |
| 2016/0365096 A1 | 12/2016 | Bocklet et al. |
| 2017/0200451 A1 | 7/2017 | Bocklet et al. |
| 2019/0043494 A1 | 2/2019 | Czyryba et al. |

OTHER PUBLICATIONS

Notice of Allowance for U.S. Appl. No. 16/017,030, dated Jul. 17, 2020.
Notice of Allowance for U.S. Appl. No. 17/092,737, dated May 4, 2022.
Office Action for U.S. Appl. No. 17/092,737, dated Mar. 2, 2022.
Campbell, W.M., et al., "Support Vector Machines using GMM Supervectors for Speaker Verification", MIT Lincoln Laboratory (2006).
Kinnunen, et al., "An overview of text-independent speaker recognition: From features to supervectors", ScienceDirect; Speech Communication; vol. 52; pp. 12-40; 2010.
Wang, A., "An Industrial Strength Audio Search Algorithm", 4th Int. Conf. on Music Information Retrieval, Baltimore 2003.

* cited by examiner

Receive a captured audio signal of sound captured from at least one microphone —202

Detect whether or not the captured audio signal includes speech spoken by at least one computer originated voice —204

Omit an action to be triggered when one or more keyphrases are present in the captured audio signal, and omit the action at least partly depending on whether the at least one computer originated voice was recognized in the captured audio signal —206

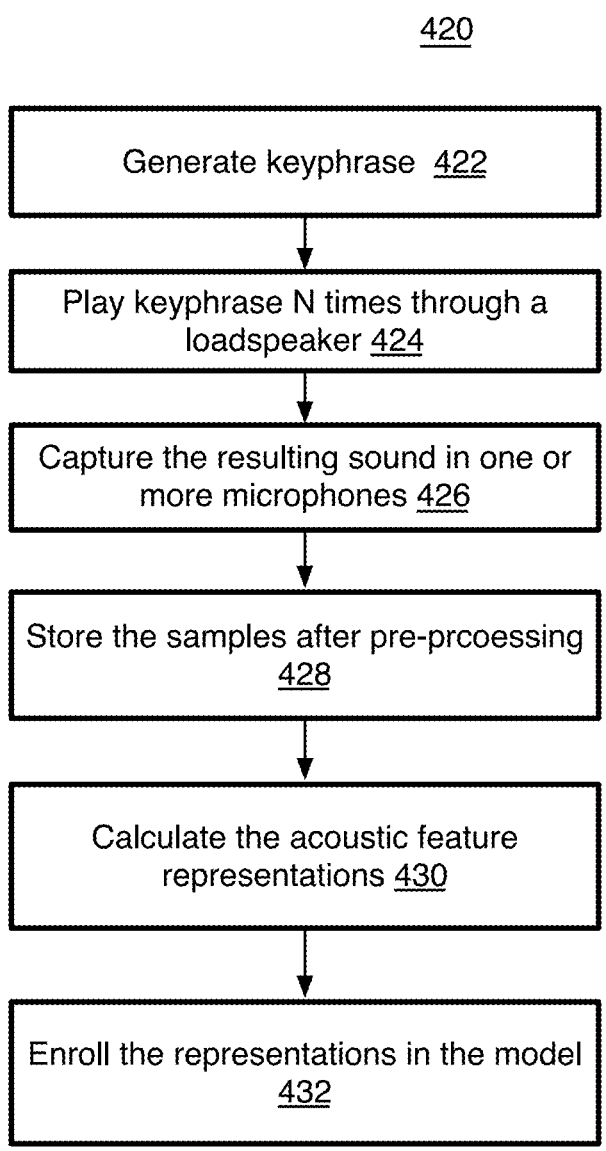

FIG. 8B  Ⓒ

Perform speaker recognition on captured audio signal portions 820

Perform feature extraction 822

Detect whether a speaker of captured audio signal portions is computer originated voice by performing model scoring at least partly based on at least one pre-enrolled computer originated voice 824

Provide Speaker Scores and weights 826

Provide Speaker weights 827

Ⓑ

Disable or ignore keyphrase detection on captured audio signal when keyphrase is spoken by computer originated voice 828

Determine Confidence scores 830

Disable or ignore keyphrase detection on captured audio signal when confidence scores meet one or more criteria 832

Ⓐ

Repeat while signal is being received 834

End

METHOD AND SYSTEM OF AUDIO FALSE KEYPHRASE REJECTION USING SPEAKER RECOGNITION

CLAIM FOR PRIORITY

This application is a continuation of and claims priority to U.S. patent application Ser. No. 17/092,737, filed Nov. 9, 2020, and titled "METHOD AND SYSTEM OF AUDIO FALSE KEYPHRASE REJECTION USING SPEAKER RECOGNITION", which is a continuation of and claims priority to U.S. patent application Ser. No. 16/017,030, filed Jun. 25, 2018 and titled "METHOD AND SYSTEM OF AUDIO FALSE KEYPHRASE REJECTION USING SPEAKER RECOGNITION", which are incorporated herein by reference in their entirety for all purposes.

BACKGROUND

Many automatic speech recognition (ASR) devices have keyphrase detection KPD (or wake on voice (WoV)) systems that recognize certain keyphrases from a user speaking into a microphone on the device. Once a keyphrase is recognized, this may trigger the awakening of an artificial intelligence (AI) assistant (also referred to herein as virtual assistant (VA) or personal assistant (PA)). The recognition of the keyphrase also may trigger the activation of other applications to perform other automatic actions. The keyphrases often include the PA's name. Such popular PA names include Apple's "Siri", Amazon's "Alexa", Microsoft's "Cortana", Google's "Hey Google", and Samsung's "Bixby", where the waking words often include the name of the PA. Such PAs can receive these wake-up calls in the form of audio signals from microphones where the audio signals include a person's spoken words. The keyphrase is often spoken before a command to the PA that may include an instruction to perform an action or a request for information. Thus, the system with the now awakened PA then may apply ASR techniques to remaining command parts of the signal to recognize what is being spoken by the user, determine the meaning of those words, and then initiate an appropriate automatic response or action depending on what was asked by the user or person.

Difficulties arise when a program on the same computing device as the PA (called the current device), or on another device audibly within listening range of the current device with the PA, automatically emits the PA's name (which is the waking keyphrase on the current device). In these cases, there are many instances when the computer program that provides the emitted keyphrase is separate from the PA program such that the PA does not know what to expect audibly, and can inadvertently respond to the emitted keyphrase, mistakenly assuming that the spoken words in the automatic audible emission originated from a person speaking into the device to wake the PA. This can occur when the PA hears and mistakenly reacts to its own waking keyphrase referred to herein as a self-trigger. This may occur when an application or media being played on a device includes audio that states the keyphrase "Alexa" and on when the application or media states the keyphrase in the same PA voice as on the listening device, here being an Alexa PA. This may occur when the audio emission is on the same device with the PA or emitted from another device within listening range of a device with the PA. The result is often a response by the PA that is something non-sensical, which causes delay, and in turn, a bad experience for the user.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of an example process for audio false keyphrase rejection using speaker recognition according to at least one of the implementations herein;

FIG. 4A is a flow chart of an example process to calibrate computer originated voices according to at least one of the implementations described herein;

FIGS. 8A-8B is a detailed flowchart of an example audio keyphrase activation system with false keyphrase rejection using speaker recognition and with the use of a reference signal according to at least one of the implementations described herein;

DETAILED DESCRIPTION

Figure 1:
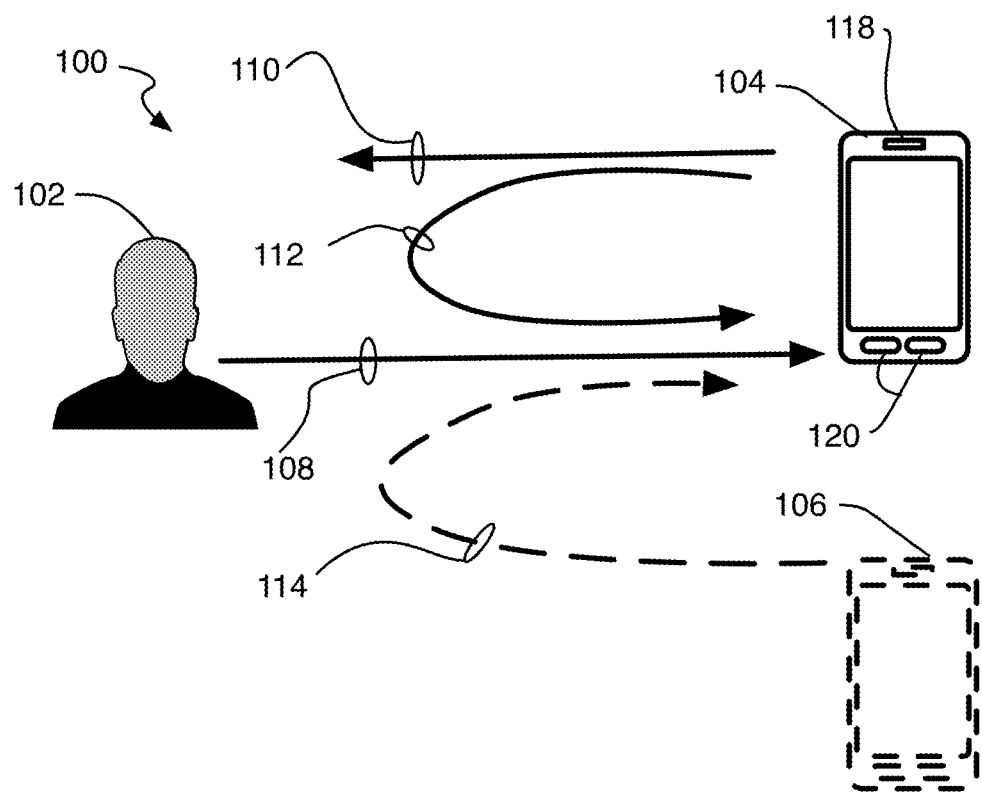
FIG. 1 is a schematic diagram of example situations when a device receives feedback in the form of a computer originated voice while monitoring received audio for keyphrase triggers.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors (DSPs), dedicated hardware, or the like) and/or packages, and/or various computing devices and/or consumer electronic (CE) devices such as set top boxes, smartphones or other smart devices, tablets, computers, automobile audio phone systems, building, room security, or environment control systems, internet of things (IoT) systems, or any other device that has a PA application, may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory machine or computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, systems, and articles of false keyphrase rejection using speaker recognition.

As mentioned, many modern speech-enabled devices come with personal assistant (PA) applications. Usually, the PA is triggered by a waking audio keyphrase, and these waking keyphrases are detected by a keyphrase detection (KPD) engine. One wake-on-voice (WoV) system that uses a KPD engine wakens upon hearing "Alexa" for example. The user then may audibly request information from the PA or request that the PA (or system with the PA) perform an automatic action, and the PA or other programs activated by the PA can provide the appropriate response or action. It will be understood that the audio keyphrase may trigger other applications (or computer programs) in addition to, or instead of a PA, but the PA is used herein as an example to explain the implementations herein.

Many of the speech-enabled devices also include programs that provide information, communication, and/or responses or answers to the user's requests to the PA and that is typically provided audibly through a computer originated voice that sounds like a person. Note that for clarity herein, a computer generated voice or computer originated voice refers to a voice formed from the production of artificial speech. This is often accomplished by using a library of initially pre-recorded samples of a person talking or synthetically formed sounds, words, phrases, or other parts of speech, and this process is often referred to as speech synthesis. These parts of speech are put together in various ways to form the artificial speech including appropriate words or language as needed.

Referring to FIG. 1, the type of applications that emit an audible computer originated voice includes the PA response itself, but also includes other types of programs that emit a computer originated voice. An example setup 100 shows the use of a computing device 104, such as a smartphone by one example, that receives audible input 108 from a user 102 and at microphones 120 on the device 104. Instead of a smartphone, the device 104 could be any device with a PA such as a smartspeaker or tablet for example. Example input from a false activation trigger due to a direct response from the PA is as follows:

USER: "Alexa, what is your name and what time is it?", where the input inquiry is shown by the input arrow 108. At this point, the PA correctly responds with:

PA: <wakes up>"My name is Alexa and it is 8:30 pm", as shown by response arrow 110 and by speaking in a computer originated voice emitted from one or more speakers 118 on the device 104. The difficulty is that this statement also becomes feedback and becomes its own input into microphones on the smartphone 104 as shown by arrow 112. Thus, in response to this statement, and upon hearing the word "Alexa", the PA performs a false voice activation trigger, and the following may occur:

PA: <wakes up again on hearing its own voice state the word " . . . Alexa . . . ">, (a self-trigger), PA: <tries to interpret "and it is 8:30 pm">, PA: "Sorry, I was not able to understand you" emitted from speaker 118 as represented by arrow 110.

Another example is when a user asks an Alexa PA about a song, and the PA replies, "This is the song 'Alexa'". These types of audio emissions also could undesirably result in a false trigger.

These types of situations where the PA reacts to a false trigger may occur whenever the device emits the waking keyphrase(s). For instance, this also includes media where a movie with video and audio (or music with just audio) may be providing sound of a PA on a smartphone that states the waking keyphrase in the movie or music ("Alexa"), and this may result in a false trigger on a real smartphone playing the movie or music as well. Another type of application that can emit the waking keyphrases is a text-to-speech (TTS) engine that converts short message service (SMS) transmissions for example by reading text messages to a user of the device and then emitting the words of the text by using an audible computer originated voice.

By yet other examples, when a first device is within the hearing range of another device with a PA, a PA or other program emitting a computer originated voice on the first device can be undesirably received as input to the voice activated PA on the other device. Thus, for example, if a second smartphone, or a different device such as a laptop, 106 (FIG. 1) emits something that sounds like, or is, the word "Alexa" in its emitted output as shown by arrow 114, this also could awaken the first device 104 as a false voice activation trigger. In all of these examples, the results are confusion and/or frustration by the user as well as delays in communication, resulting in a poor experience for the user.

One solution would be to switch off the KPD-PA recognition pipeline when another program is emitting speech on the same device and by using a computer generated voice, or its own PA program is providing a response. However, in terms of user experience this is undesirable because it eliminates the ability for the user to interrupt the answer or speech being emitted to request something else from the PA. In other instances, the switching on and off of the program simply will not occur fast enough to operate properly.

Moreover, as mentioned above, other speech emitting programs are typically completely separate processes from the KPD-ASR, and may originate from a different vendor and are often executed over a cloud service for example. Thus, from the point of view of the PA, it is not even known whether or not the other voice emitting program is active. This is especially true when multiple devices are involved and do not have any direct communication between each other, which could be the case for devices 104 and 106 (FIG. 1) for example.

Also, another suggested solution is to continuously apply ASR as an audio signal is received to determine if the input words make sense and are directed to the PA rather than any other application or for other reasons. This solution, however, will not work efficiently because ASR is too computationally complex to run continuously on such a data stream since it has such a large vocabulary among other reasons. Such ASR typically requires about 10-50 times more compute than KPD.

By another option, an additional keyphrase detector (KPD or recognizer) is applied to an internal, intentionally generated playback (or feedback or loopback) path or circuit rather than merely listening for feedback in the captured audio input. This is a copy of the audio data that is being output and redirected back to a KBD unit. When the keyphrases are detected on this reference pathway, the voice activation triggers are omitted, and the PA remains off. Such a system is disclosed in U.S. patent application Ser. No. 15/838,489, filed Dec. 12, 2017, published as U.S. Patent Publication No. 2019/0043494, published on Feb. 7, 2019, and titled "Suppressing key Phrase Detection in Generated Audio Using Self-Trigger Detector". This system can be used when the reference signal (also referred to herein as a playback or loopback signal) is available on the local device. In other words, these reference playback approaches reduce the number of false triggers on the signal originating from the same device emitting the audio. This may be accomplished by first employing an acoustic echo cancellation (AEC) algorithm that uses adaptive filtration to eliminate the echo signal from the captured audio. Second, the reference playback approach also performs KPD on the reference signal, and may disable the KPD on the captured signal when a keyphrase is detected on the reference signal. Thus, the reference playback signal is required in order to operate the AEC and additional reference KPD. If the keyphrase is played back by another device that is not somehow wired or linked to the device with the KPD, AEC and the additional KPD does not help. Therefore, the self-trigger detection is limited to the case when the loopback stream is connected directly to the same device and the same audio controller's driver stack, software (SW), or firmware (FW) that is used by the keyphrase detection system. If the playback is performed on any other audio device (i.e., USB drive, other audio controller, and so forth) that does not provide a loopback signal to a KPD device, then no benefit exists of using this solution. To state it another way, in scenarios where multiple devices are present as mentioned above, running an additional keyphrase engine on an internal playback-path rather than on the received audio may provide KPD detection to reduce or eliminate false triggers for that local machine, but cannot detect the trigger keyphrases from other devices.

Also, the playback KBD unit can still miss the keyphrases on the reference signal and permit a false voice activation trigger due to certain acoustic conditions. Particularly, even if AEC is operating in a reference pipeline, the cancellation may not be ideal. A residue echo signal after imperfect cancellation from AEC can produce acoustic artifacts that cause the KPD engine to miss triggers on the reference path while triggers on the capture path are being recognized. In such cases, this solution does not work either.

To resolve these issues, the systems and methods presented herein can identify that the captured audio contains speech which was generated by another application or its own PA that emits an artificial computer originated voice (COV). With that information, the methods herein can identify that a trigger, which may be the identification of a keyphrase in the captured audio signal, and of a wake on voice (WoV) engine for example, has been caused by the speech of the application or its own PA and not by a person speaking into a smart device.

Specifically, the system and method disclosed herein are used to detect or recognize the voice of the speaker of the keyphrase which triggers an action, such as the wakening of the PA, and omits the action if the speaker is identified as a computer originated voice such as the PA's own voice. This is accomplished by using a voice or speaker recognition (SR) system such as with speaker verification (or identification) in order to learn the characteristics of the its own PA voice, other voice applications, and other popular, known PA voices when desirable, and filter out detections of that voice or voices. Such an approach limits unwanted triggers caused by any device that uses the same computer originated voice or voices. Herein, speaker verification and speaker identification are meant in a general sense and both refer to identification of a voice relative to one or more modeled voices that are to be filtered out (or some action is to be taken upon identification of a voice that matches a modeled voice).

Also herein, the speech used to wake an application is not particularly limited and therefore may be referred to as a keyphrase which includes any one or more sounds, parts of words, syllables, words, phrases, sentences, any combination of these, or any other part of speech that can be used as a keyphrase to waken an application, and are not meant to limit the keyphrase to any certain number of words for example.

In more detail, SR can be used to identify the voice of the PA or other program of its own (or referred to as the current) device so that its own responses or emissions in a computer generated voice are either ignored or the detection of the KPD detection is disabled, thereby effectively filtering out (or suppressing) the false trigger keyphrases in the recognized voice which reduces false triggers. This method also will recognize and ignore the same PA voice emitted from other devices within the hearing range of the current device. Further, the current device may recognize and ignore the most popular computer generated voices, such as say the five most popular computer generated voices or some other number of voices that may cover most smartphone PAs and other computer generated voice systems throughout the world, and to further reduce false voice activation triggers when a group of devices with different PAs are in one place and within hearing range of the current device's microphones.

Referring to FIG. 2, an example process 200 of false keyphrase rejection using speaker recognition is arranged in accordance with at least some implementations of the present disclosure. Process 200 may include one or more operations 202-206 generally numbered evenly. Process 200 or portions thereof may be performed by a device or system (e.g., systems 300, 400, 700, 900, 1000, or any other device or system discussed herein).

Process 200 may include "receive a captured audio signal of sound captured from at least one microphone" 202. The captured audio signal refers to the audio data, whether analog or digital, obtained from one or more microphones, and now being analyzed along a captured signal or captured input path, circuit, or pipeline to determine whether a keyphrase exists in the captured audio signal. As mentioned with the situations 100 above, the captured audio signal may include feedback from the same device that is performing the process 200 and/or may include sounds from other audio devices within listening (or hearing) distance of the current device.

Process 200 may include "detect whether or not the captured audio signal includes speech spoken by at least one computer originated voice" 204. A computer originated voice refers to a voice that may be a compilation of pre-recorded pieces of a human voice or may be formed of purely synthetic computer generated sounds or some combination of both. Thus, by one form, such a voice may be formed by recording sounds that are parts of speech such as sounds of letters, parts of words, words, phrases, or any combination of these spoken by a person. These sounds are saved and then assembled by an automatic speaking application, such as the PA or other voice emitting applications, to form responses to a user inquiry received at a microphone of a computing device for example. Otherwise, the voice may be purely or partly created by sounds made by a computer rather than a recording of a human voice. The computer originated voice may be made of sounds using the known characteristics of human speech such as the known range for pitch, speed, volume, accent, and so forth, or may be intentionally outside of the ranges of human speech to create an intentionally artificial sounding voice. Many examples exist, and the present method is not limited to a certain type of computer originated voice as long as the computer originated voice can be enrolled in a speaker recognition model and subsequently recognized during a run-time of the speaker recognition. It will be noted, however, that herein a computer originated voice is differentiated from those voices that could be generally described as computer generated but are merely re-emissions of an actual human speaking instead of an artificial voice, such as hearing a voice over a smartphone whether a live conversation such as when putting a caller on speaker mode when using the smartphone as a telephone (or cell phone), or a recorded audible telephone message on voice mail and emitted in speaker mode for example.

In operation, the SR system here performs speaker recognition by monitoring or analyzing the captured audio signal. This can be performed in a number of different ways, and by one form, a preliminary enrollment process may be used that enrolls the at least one computer originated voice to form a speaker recognition model to be used later to detect the computer originated voice. This may involve emitting the computer originated voice over one or more speakers and capturing the emitted computer originated voice on microphones to generate a captured audio signal. Feature extraction may be applied to capture the true features of the computer originated voice and then generate the speaker model. A calibration process also is available to refine the features at a user's location in the environment where the system and device is more likely to be used, and then basically repeats the enrollment process and adjusts the pre-made speaker model.

During run-time, samples of the captured audio signal are compared to the features or voice profiles of the speaker model. This produces a speaker score for the likelihood that an utterance of speech in the captured audio signal was spoken by a computer originated voice, such as a by a voice emitting program or its own PA, and relatively continuous scores may be provided while one or more utterances are being analyzed. The higher the score, the more likely there is a match between the run-time speech sample of the particular speaker and the speaker model trained with enrollment speech samples. By one example, the decision whether to accept or reject the speaker is determined by comparing the speaker score to one or more pre-determined thresholds. The thresholds may provide or quantify a minimum similarity amount for positive recognition of a computer originated voice. The implementation of the SR process into the method of keyphrase rejection is provided below.

By one form, the captured audio signal is first checked for trigger keyphrases such as with a wake-on-voice (WoV) system that uses a keyphrase detection (KPD) unit to apply automatic speech recognition (ASR) algorithms In this case, the system then only applies the speaker recognition to the detected keyphrases. By another approach, the speaker recognition is applied to the captured audio signal before, or regardless of, detection of the keyphrases.

Process 200 may include "omit an action to be triggered when one or more keyphrases are present in the captured audio signal, and omit the action at least partly depending on whether the at least one computer originated voice was recognized in the captured audio signal" 206. Thus, in those cases when the speaker recognition was applied to detected keyphrases rather than the whole captured audio signal, the output of the keyphrase detection may be ignored so that it does not trigger an action, such as the wakening of a PA, when the computer originated voice was recognized. Otherwise, when speaker recognition was applied to the captured audio signal without regard to the detection of the keyphrases, the keyphrase detection unit may be disabled when the computer originated voice is recognized in the captured audio signal.

For a number of different options, an audio processing device used herein may have a loopback (or playback) reference circuit to analyze a copy of the audio being output from the device, and the method here may include analyzing a loopback reference signal (or just reference signal) to determine a reference score indicating whether the reference signal is likely to include one or more keyphrases. This may include applying keyphrase detection to the reference signal, and separate from the application of KPD to the captured audio signal. Then both the reference score and a speaker score indicating a likelihood that the captured audio signal was spoken by the at least one computer originated voice may both be used to generate a confidence score that can be compared to a threshold or other criteria to determine if the action (or wakening) should be omitted. Such confidence score could include weights applied to the speaker score, reference score, or both. Herein, the confidence score also may be considered a final reference signal keyphrase detection score that uses the speaker score to adjust the initial reference score, and then to determine if the action should be omitted by using the final score.

By variations of this option, instead of a confidence score, the method may determine to omit the action because the captured audio signal was spoken by the at least one computer originated voice after analysis of the loopback reference signal, without use of the speaker score, did not find a keyphrase in the loopback reference signal, or alternatively, the method may include determining to omit the action when the loopback reference signal is found to have the one or more keyphrases after it was determined the computer originated voice was likely not the speaker of the captured audio signal. Otherwise, either of these variations could be combined with finding the confidence score as mentioned above, where one of the determinations alone (either reference score or speaker score) is a preliminary determination that results in the omission of the action if positive, but otherwise the confidence score is calculated and used to decide as to whether or not to omit the action.

By yet another variation, pattern matching between the reference signal and captured audio signal is performed where speaker recognition features are formed for both signals and then compared for similarities. A similarity score results and is used as the deciding factor to compare to criteria or may be treated as a similarity weight that is used to perform KPD on the captured audio signal.

As mentioned, the captured audio signal may comprise its own playback, but could additionally include at least one non-local computer originated voice audibly emitted from at least one non-local audio device separate from a current audio device having microphones forming the captured audio signal. In this case, the non-local computer originated voice is recognizable by speaker recognition initiated at the current device. Thus, for one example, when a smartphone is within hearing distance of a smartspeaker with a PA, the smartphone may emit the same PA voice as the smartspeaker, and the smartspeaker will be able to detect the voice and omit the wakening of the PA on the smartspeaker. Also as mentioned, other PA voices than the one used on the smartspeaker (or current device) may be recognized as well. The details are described below.

Figure 3:
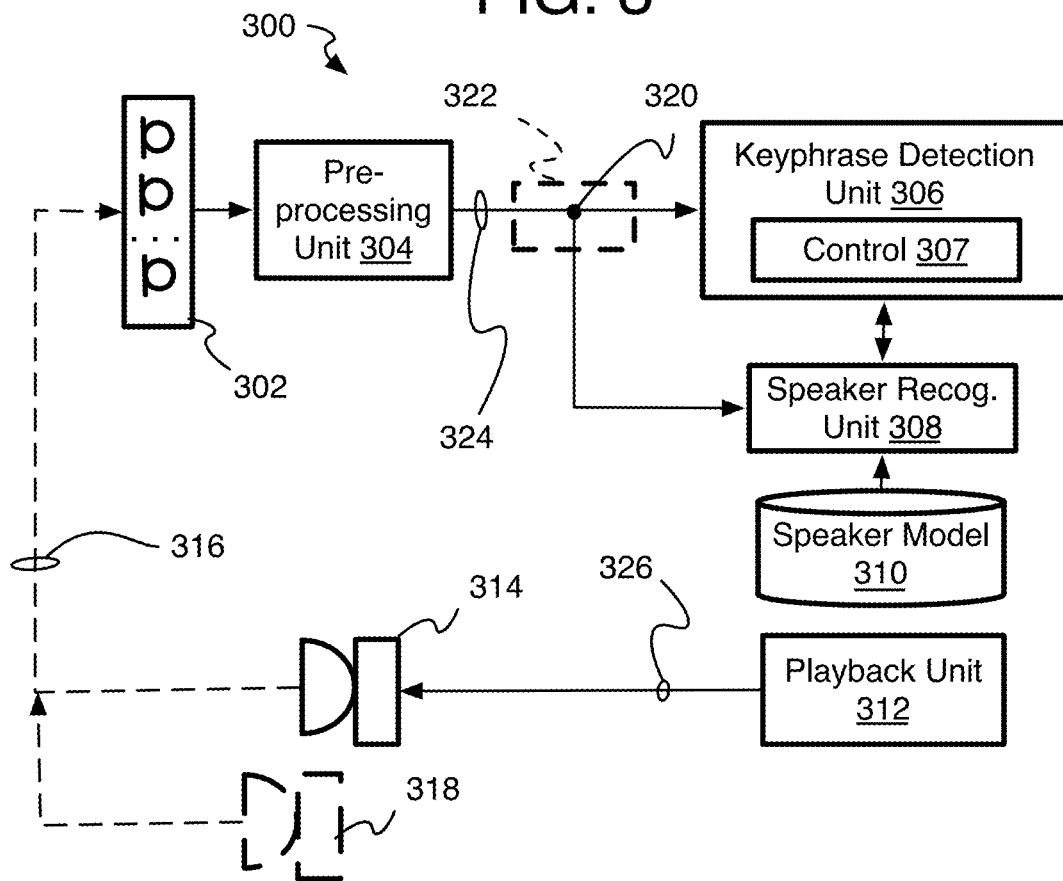
FIG. 3 is a schematic diagram of an example audio keyphrase activation system with false keyphrase rejection using speaker recognition according to at least one of the implementations described herein.

Referring to FIG. 3, an audio processing device 300 performs automatic speech recognition activation for a personal assistant (PA) voice activation application or other automatic speech recognition applications for this example. Device 300 may be any suitable audio computing device such as a computer, a smartspeaker, a personal speech assistant, a laptop, an ultrabook, a smartphone, a tablet, a phablet, a wearable device such as a smart watch or wrist band, eye glasses, head phones, a security device whether a separate device, a conferencing device, a cloud based computing device, or the like. The audio processing device 300 may have a microphone or microphone array 302, a preprocessing unit 304, and a keyphrase detection unit 306 all along a capture path (or circuit) 324. The device 300 also may have a speaker recognition unit 308 and a speaker model 310. A playback unit 312 and one or more speakers 314 may be provided along an audio output path (or circuit) 326. A separate (or non-local) device emitting computer originated voices may alternatively or additionally provide audio from one or more non-local speakers 318 as well.

The playback unit 312, here on the same device 300, may emit audio including a computer originated voice, whether the PA itself or other PA or voice emitting application, and emitted through one or more speakers 314. Alternatively, or additionally, a separate device may provide audio from the speaker 318 and that includes a computer originated voice. By one example, the PA application, or at least the KPD unit 306, does not have prior knowledge of the contents of the audio being emitted, and then received at microphones 302.

The microphone or microphone array 302 receives audio input or sound waves from one or more speakers 314 on the same device and/or one or more speakers 318 from a different device than the device forming the captured audio signal. The microphone array 302 can feature a beamformer to reduce background noise and dereverberation to mitigate room reverberation. The audio input may include a computer originated voice as described above. Microphone 302 may convert the audio input into an electrical signal such as a digital signal to generate the captured audio signal (or input audio data). This may include any analog to digital conversion when needed and if not provided separately during pre-processing.

The pre-processing unit 304 may perform sufficient pre-processing of the captured audio signal to perform speaker recognition and keyphrase detection as described herein. This may include obtaining short samples of the captured audio signal, such as 25 ms samples, and by some set sampling frequency, to be analyzed sample by sample.

The pre-processed captured audio signal then may be provided to the keyphrase detector (KPD) unit 306 to detect trigger keyphrases in the captured audio signal. If the keyphrase exists, this triggers an action such as wakening an application such as a PA or ASR application. By one example, this includes detecting waking keyphrases for a wake-on-voice (WoV) or voice activation system that wakens a PA with a trigger keyphrase such as "Alexa".

The speaker recognition unit 308 may monitor the captured audio signal at end point 320 by performing feature extraction. For one option, the recognition unit 308 also communicates with the KPD unit 306 to obtain indication of which parts of the captured audio signal have a keyphrase so that those parts of the captured audio signal can be tested for computer originated voices rather than the non-keyphrase parts of the signal. By another form, the speaker recognition unit analyzes the captured audio signal regardless of the presence of keyphrases. In either case, the speaker recognition unit 308 may send a signal to a control 307 of the KPD unit 306 to disable the KPD unit or have the output of the KPD unit ignored. By one option, a shared feature extraction unit 322 could be provided and the KPD unit 306 and the speaker recognition unit 308 could use the same features from the captured audio signal and for the two different operations.

The speaker recognition unit 308 compares voice profiles of the computer originated voices to features obtained from the captured audio signal, which may be in the form of feature representations such as feature vectors. The voice profiles may be pre-enrolled in one or more speaker models 310 as described in detail below.

The speaker recognition unit 308 then generates a speaker score after some time interval that corresponds to some interval of frames to provide discrete speaker scores, or may provide speaker scores for each frame to provide continuous speaker scores (or more precisely, continuous monitoring of the signal for speaker scores) as the captured audio signal is being analyzed. The speaker scores are then compared to criteria such as one or more thresholds for a decision as to the presence of the computer originated voice. By other options explained below with device 700 (FIG. 7), the speaker scores are provided to generate a confidence score (or final reference signal keyphrase detection score) when a loopback reference signal is provided.

While the device 300 is described as having the keyphrase detection unit 306, speaker recognition unit 308, speaker model 310, and playback unit 312 and having them physically locally on the device to reduce latency as much as possible, it will be understood that having these units also includes any or all of these units, whether the entire unit or just parts of these units, being physically located remote from the device 300 that has the microphones 302. Thus, these units could be located at a server communicating over a network such as a wide area network such as the internet or other network such as a local area network (LAN).

Figure 4:
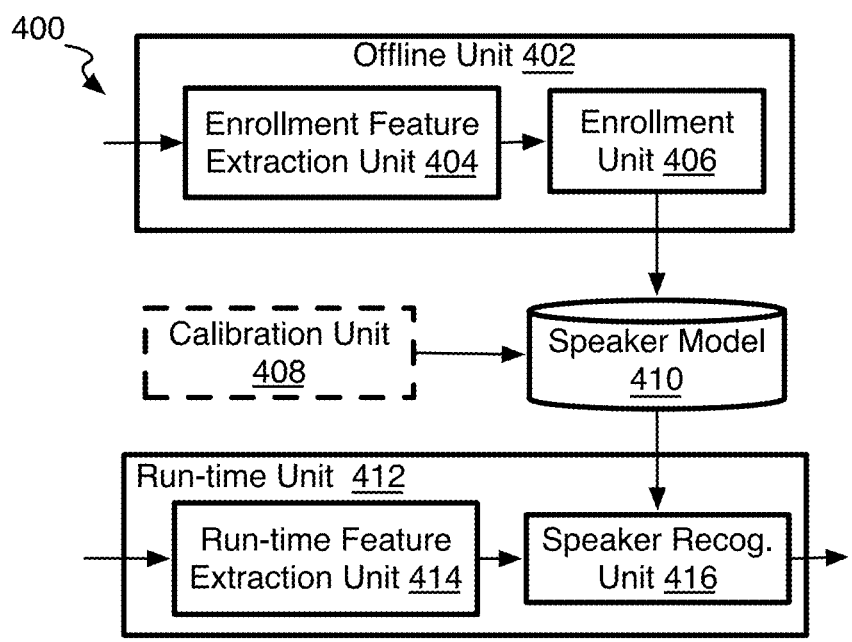
FIG. 4 is a schematic diagram of an example speaker recognition system according to at least one of the implementations described herein.

Referring to FIG. 4, an overview of a system 400 for the speaker recognition is provided, and may have an off-line unit 402 that performs enrollment, and a run-time unit 412 that performs the run-time matching or classifying operations to detect a computer originated voice in the captured audio signal.

For the enrollment process, an enrollment feature extraction unit 404 extracts the acoustic features from an enrollment signal received from microphones, and the resulting feature representations are then used by an enrollment unit 406 to build time-invariant speaker models 410. The features can be representations such as spectrograms, Mel-Frequency Cepstral Coefficients (MFCC), GMM/DNN-based supervectors, or i-vectors. The process is repeated for a number of example utterances to obtain high precision. This may be achieved by generating a number of samples from applications that emit a computer originated voice and augmenting them by applying transformations such as filtration or convolution with a set of impulse responses in order to make the system more robust for noises, reverberation, or adverse acoustic conditions. For text-dependent speaker recognition, the application emits the computer originated voice speaking certain desired words, such as the trigger keyphrases, that are to be detected for example. For text-independent speaker recognition, the application emits the computer originated voice speaking for a certain length of time, such as for at least a few seconds, and may be a random sentence or phrase that makes grammatical sense or could be random words, but in either case may still include one or more potential trigger keywords. Also, the enrollment may be repeated for a number of different computer originated voices so that more than one voice may be recognized by a single computing device. For example, the enrollment may include all voice options provided by a particular computing device where at least one voice characteristic (pitch, accent, etc.) is changed with each voice, and/or include voices of some top number of popular computer originated voices used by some number of the top selling computing devices, or include voices of the best selling computing devices of the top five brands for example, and so forth. The enrollment process can be performed offline as part of the tuning procedure and does not require the user's interaction.

A calibration unit 408, however, or at least an interface for the calibration unit, is provided on the device that will capture the audio. To achieve more robustness in the working system, the enrollment process can be enhanced by a calibration operation in the actual conditions in which the device is used. Thus, the calibration may be performed after a user obtains the device and within the environment the user will usually use the device such is in a home or office for example.

Referring to FIG. 4A, an example calibration process 420 may include "Generate keyphrase" 422, and by one example, from the PA itself or other applications that emit a computer originated voice. Then the calibration process 420 may include "Play keyphrase N times through a loudspeaker" 424 to generate audio to be captured by a microphone. Calibration process 420 then may include "Capture the resulting sound in one or more microphones" 426 and "Store the samples after pre-processing" 428 and as pre-processing is described above. Calibration process 420 next may include "Calculate the acoustic feature representations" 430, and then "Enroll the representations in the model" 432 as in the enrollment.

Due to this approach, the enrolled representations (or voices or voice profiles) reflect the distortions which are typical for the specific device, room, and acoustic background, which improves the accuracy of the speaker recognition matching algorithm. Calibration can be performed when the device is first deployed in the end-user's home. Note that the calibration step is optional; the models could alternatively be generated completely offline.

During run-time, the run-time unit 412 may have a run-time feature extraction unit 414 and a speaker recognition unit 416, where the feature extraction unit 414 may or may not be considered a part of the speaker recognition unit 416, as with speaker recognition unit 308. The feature extraction unit 414 extracts feature representations from the captured audio signal as mentioned above, and then provides those feature representations for speaker recognition. The speaker recognition unit 416 compares the representations to voice profiles (or feature representations) of computer originated voices from the speaker model 410. Speaker scores are then compared to thresholds or other criteria to control a trigger KPD unit also as described elsewhere herein. The details for running the keyphrase rejection using speaker recognition are provided below.

For the calibration process, by one example at least a calibration interface is presented on the computing device that generates the captured audio signal while the calibration enrollment processing may occur at a remote server or other computing location. Such an interface may prompt a user to perform the calibration upon the first start of an application, such as the PA or other voice emitting application, or the user may be required to activate the calibration, and/or the calibration may be performed automatically and periodically as audio input with computer originated voices are received by the computing device. Many different variations are contemplated. By other options, some or all of the calibration enrollment processing may be performed on the computing device.

Figure 5A:
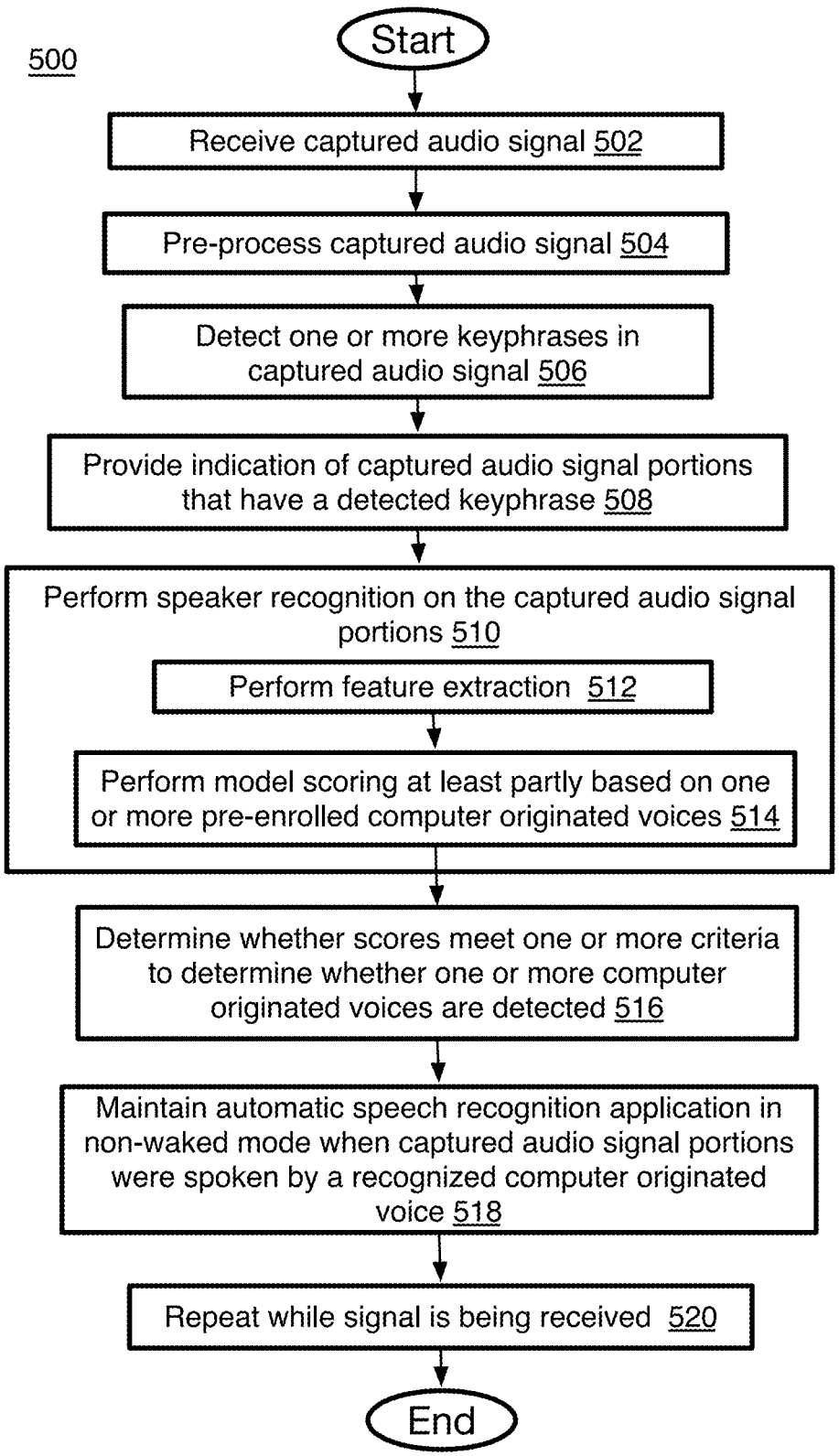
FIG. 5A is a detailed flow chart of an example method of false keyphrase rejection using speaker recognition according to at least one of the implementations described herein.

Referring to FIG. 5A, an example process 500 of keyphrase rejection using speaker recognition is arranged in accordance with at least some implementations of the present disclosure. Process 500 may include one or more operations 502-520 generally numbered evenly. Process 500 or portions thereof may be performed by a device or system (e.g., systems 300, 400, 700, 900, 1000, or any other device or system discussed herein). Process 500 exemplifies the option where speaker recognition is performed on the portions of the captured audio signal that have a pre-detected keyphrase.

Process 500 may include "Receive captured audio signal" 502, and as described above, this involves receiving audio input outputted from the current device or another device and that may include one or more computer originated voices at microphones that convert the audio input into a captured audio signal for a capture pathway Process 500 may include "Pre-process captured audio signal" 504, and also as described above, may include obtaining samples of the signal, denoising, and so forth.

Process 500 may include "Detect one or more keyphrases in captured audio signal" 506, and this operation is performed before speaker recognition is performed on an utterance or part of the captured audio signal in order to indicate which parts of the captured audio signal have a keyphrase. Otherwise, the speaker recognition may be kept off or asleep when no keyphrase is present.

Thus, the keyphrase detection on the captured audio signal may include extracting features by forming feature coefficients or other representations of the features, collecting the samples or features into frames, and then providing the feature data of the frames (or feature vectors by one example) to one or more neural networks and/or other classifier algorithms trained to detect one or more keyphrases by using keyphrase models in an automatic speech recognition (ASR) type of process. The detection decision may be performed by providing a keyphrase (KP) score to an utterance and declaring the utterance to be a keyphrase if the score meets one or more criteria such as being over one or more thresholds.

Stated another way, one part of KPD is the decoding of a state sequence. States relate to phonetic subunits such as phonemes or triphones. The scores are accumulated from a classifier in a state machine and then compare to one or more thresholds. This is one possible implementation. There also exist KPD techniques in which the whole observation containing the wake word is analyzed by the classifier, and in this case, just one score may be provided.

Process 500 may include "Provide indication of captured audio signal portions that have a detected keyphrase" 508, and this may involve providing the speaker recognition unit a 0 or 1 (no or yes) indicator for a current frame of the captured audio signal being analyzed and held in memory, processor registers, or other location accessible by the recognition speaker unit, or alternatively a keyphrase confidence score that can be compared to a threshold for a decision or used in speaker recognition equations.

Figure 6:
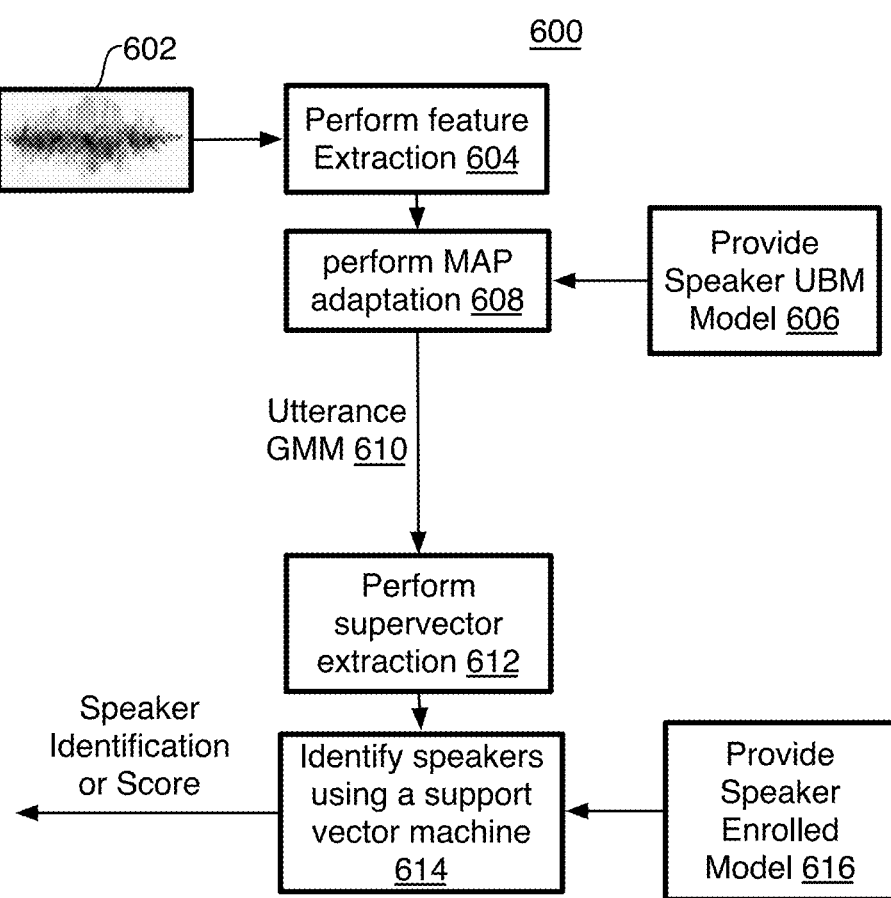
FIG. 6 is a flow chart of an example process of speaker recognition according to at least one of the implementations described herein.

Process 500 may include "Perform speaker recognition on the captured audio signal portions" 510, and this operation may include "Perform feature extraction" 512 and "Perform model scoring at least partly based on one or more pre-enrolled computer originated voices" 514. Here, the speaker recognition is applied to the parts (or frames) of the captured audio signal indicated to be a keyphrase by the KPD unit. By one implementation, the speaker recognition is only applied to the utterances that are indicated to be keyphrases. The speaker recognition operations are detailed below with process 600 (FIG. 6). It will be appreciated that since the keyphrases are detected first for applying speaker recognition to those specific utterances of the keyphrases, text-dependent speaker recognition could be applied here for increasing the accuracy of the speaker recognition. The result is a speaker score for individual keyphrase utterances that indicate the likelihood the utterance was spoken by a computer originated voice.

Process 500 next may include "Determine whether scores meet one or more criteria to determine whether one or more computer originated voices are detected" 516, and here the speaker score may be compared to one or more thresholds. Such thresholds may be fixed or may vary by one or more parameters such as a detected SNR level of the captured audio signal, and so forth.

Process 500 may include "maintain automatic speech recognition application in non-waked mode when captured audio signal portions were spoken by a recognized computer originated voice" 518. This operation provides one example of the type of action (waking ASR for a PA) that can be triggered by the presence of a keyphrase in the captured audio signal, but instead is omitted. The PA program remains in a sleeping mode despite the presence of a keyphrase because the keyphrase was found to be spoken by a computer originated voice. Due to the use of the speaker recognition, this operation omits the action whether the utterance was spoken by a computer originated voice from the same device analyzing the captured audio signal or from a completely different, separate computing device. It will be understood that the action that is omitted could be any other triggered action such as the waking of ASR for a different program than the PA such as a dictation program, or other end programs not related to ASR such as a security-related application that controls access to software or to something physical such as a door lock or garage opener.

Process 500 may include "Repeat while signal is being received" 520, and refers to repeating the process for each utterance detected by the KPD unit while the captured audio signal is being received.

Figure 5B:
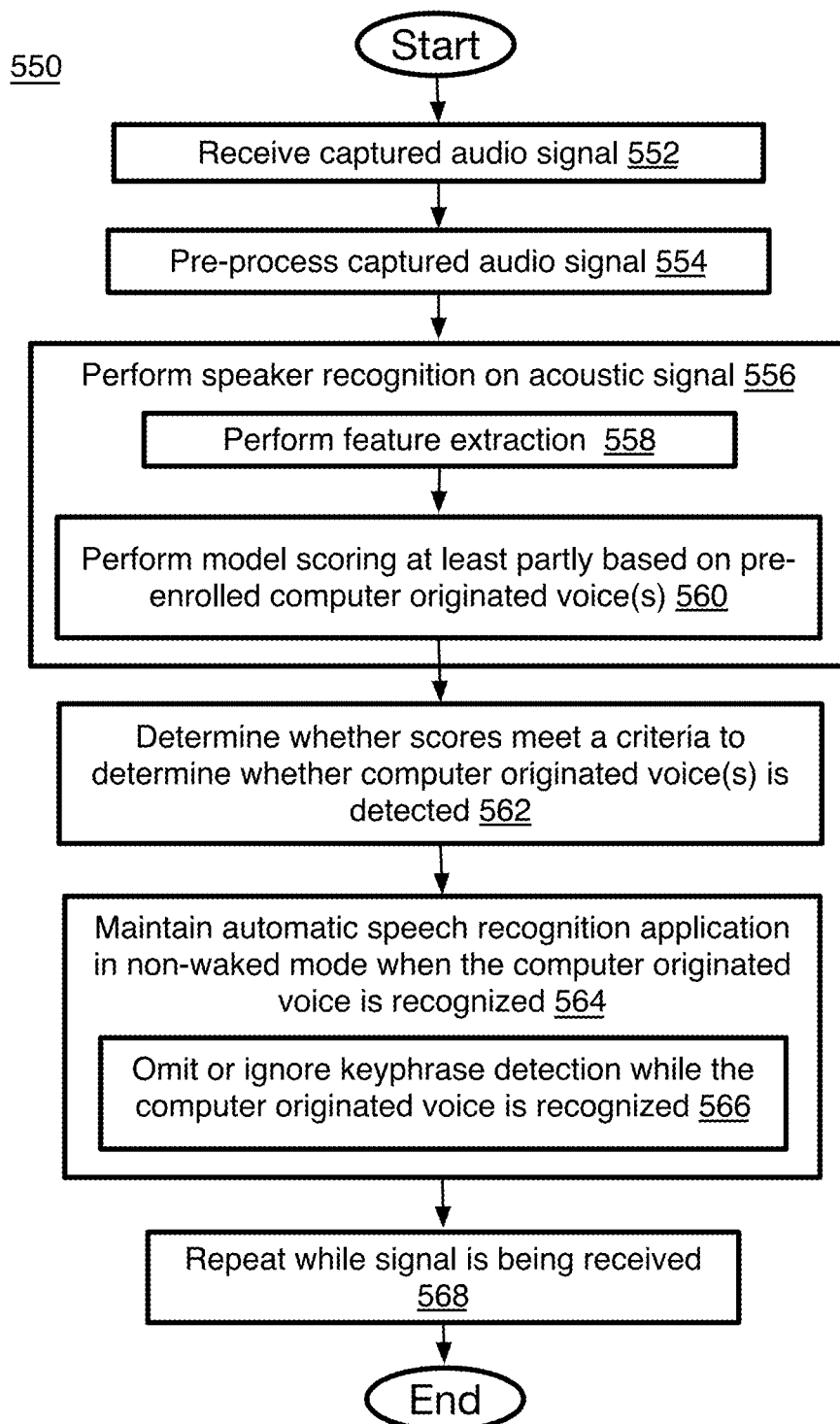
FIG. 5B is another detailed flow chart of an example method of false keyphrase rejection using speaker recognition according to at least one of the implementations described herein.

Referring to FIG. 5B, an example process 550 of keyphrase rejection using speaker recognition is arranged in accordance with at least some implementations of the present disclosure, but here the captured audio signal is analyzed by speaker recognition without first determining whether keyphrases are in the captured audio signal (or at least not using the KPD determination for speaker score determination). Process 500 may include one or more operations 552-568 generally numbered evenly. Process 550 or portions thereof may be performed by a device or system (e.g., systems 300, 400, 700, 900, 1000, or any other device or system discussed herein).

Process 550 may include "Receive captured audio signal" 552, and "Pre-process captured audio signal" 554, which are similar to operations 502 and 504 already described above for process 500.

Now, however, process 550 performs the speaker recognition in a different order. Here, the speaker recognition may be performed before the KPD is applied or separately parallel to the KPD. Thus, operations 556 to 562 are the same or similar to operations 510 to 516 in process 500 to determine or recognize a computer originated voice in the captured audio signal. Here, however, since results of KPD may not be available for the speaker recognition analysis, text-independent speaker recognition may be applied, and this may be based on a stream or pattern of a relatively continuous speaker score of a captured audio signal. Such continuous speaker scores may be provided for features constructed at intervals of a certain minimum number of samples or each frame or some small interval of frames for example.

Thereafter, process 550 may include "maintain automatic speech recognition application in non-waked mode when the computer originated voice is recognized" 564. This operation includes, "Omit or ignore keyphrase detection while the computer originated voice is recognized" 566. This operation refers to indicating that a computer originated voice was recognized as the speaker of the captured audio signal, and the KPD should not trigger the action. Thus, a control of the KPD unit may receive the indication from the speaker recognition unit and then either disable the keyphrase detection on the current captured audio signal so that such detection operations are omitted, or alternatively or additionally, have the output of the KPD unit ignored so that no action is triggered even when the KPD unit indicates a keyphrase was detected in the captured audio signal.

Process 550 may include "repeat while signal is being received" 568, and to apply speaker recognition to the captured audio signal as long as the captured audio signal is present.

Referring to FIG. 6, one example process 600 of speaker recognition is arranged in accordance with at least some implementations of the present disclosure. Process 600 may include one or more operations 602-616 generally numbered evenly. Process 600 or portions thereof may be performed by a device or system (e.g., systems 300, 400, 700, 900, 1000, or any other device or system discussed herein).

Process 600 may include inputting or receiving (or otherwise obtaining) a captured audio signal 602, and as already explained above.

Process 600 may include "perform feature extraction" 604. Here, the extracted features may include any suitable features, feature vectors, or the like such as coefficients representing a power spectrum of audio data such as mel-frequency cepstrum coefficients (MFCCs) or perceptual linear prediction (PLP) coefficients. By one form, the feature representations may be the same as those used for keyphrase detection. This operation computes a more compact and effective representation of speech samples by using frequency-domain analysis techniques such as fast Fourier transform (FFT) for example.

Process 600 may include "provide speaker UBM model" 606, and here a universal background model (UBM) is provided which is a generic model. A UBM is an attempt at pool training samples from a large number of speakers to represent the population of speakers by a single average speaker-independent model. The UBM is a world model that is used to represent general feature characteristics.

Process 600 may include "Perform MAP adaptation" 608. To verify an utterance, an utterance GMM is created via Maximum-A-Posteriori adaptation (MAP-adaptation) of the UBM and adapted to the feature representations of the captured audio signal. See for example, Campbell et al., "Support Vector Machines using GMM Supervectors for Speaker Verification", MIT Lincoln Laboratory (2006). The result is an utterance GMM 610 with Map adapted means.

Process 600 may include "Perform supervector extraction" 612, which converts the utterance GMM into a super vector by concatenation of GMM elements such as stacked mean vectors of the mixture components.

Process 600 may include "Identify speakers using a support vector machine" 614. This may include first training a support vector machine (SVM) on the one or more computer originated voices (COVs) enrolled in a speaker enrolled COV model. This is performed to determine if the captured audio signal is similar to the enrolled signal (or voice profile) which was previously enrolled in the speaker enrolled COV model. Such types of speaker verification algorithms are disclosed in Campbell et al., cited above; U.S. Patent Publication No. 2017/0200451, published Jul. 13, 2017, and titled, "Replay Attack Detection in Automatic Speaker Verification Systems"; and U.S. Patent Publication No. 2016/0365096, Published Jul. 13, 2016, and titled, "Training Classifiers Using Selected Cohort Sample Subsets" for Gaussian Mixture Model—Super Vector Machine based text-(in)dependent speaker verification.

Thus, the speaker enrolled COV model is provided 616, and the SVM matches the individual extracted supervectors to an enrolled COV by classifying the extracted supervector. The result of the SVM is a speaker score indicating the likelihood that the utterance represented by the extracted supervector was spoken by a computer originated voice.

Figure 7:
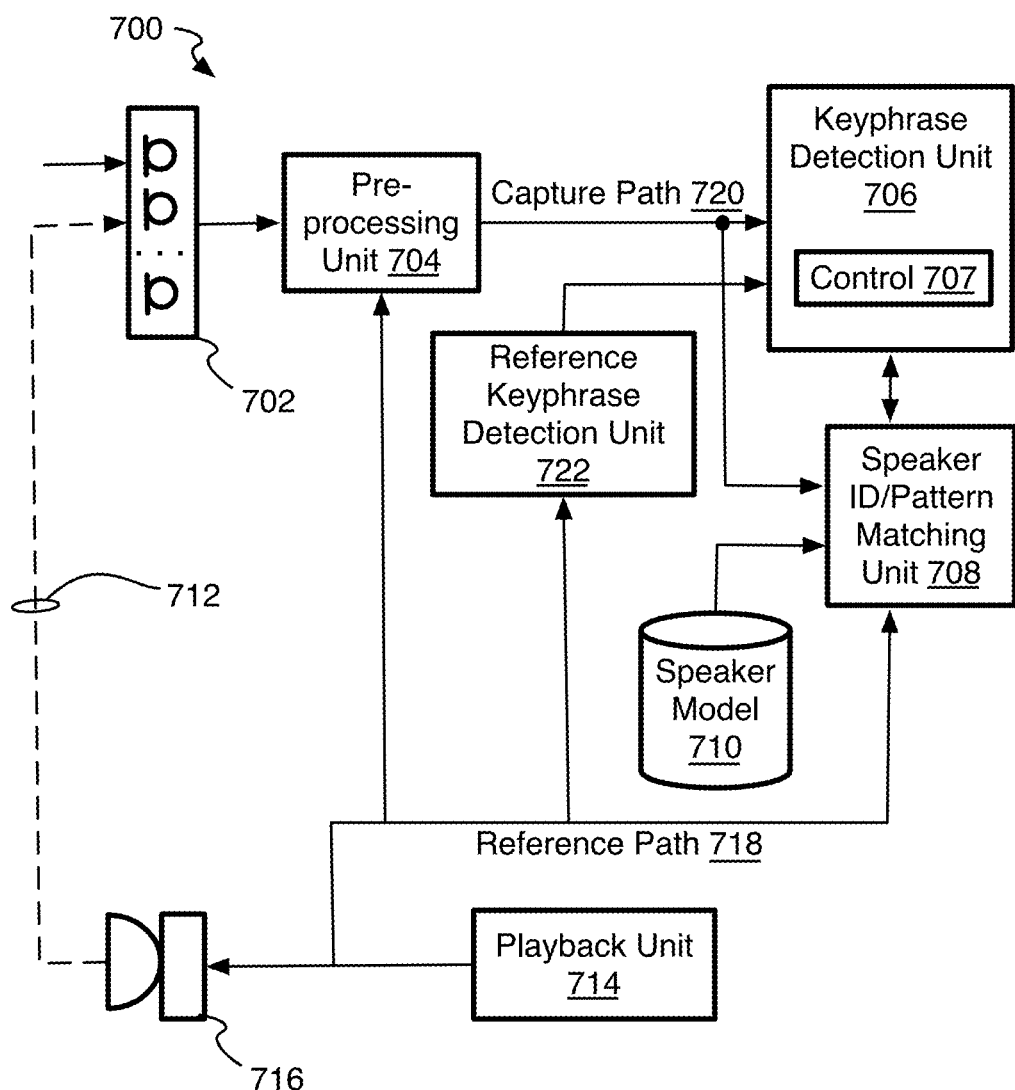
FIG. 7 is a schematic diagram of an example audio keyphrase activation system with false keyphrase rejection using speaker recognition and with the use of a reference signal according to at least one of the implementations described herein.

Referring to FIG. 7, an audio processing device 700 is similar to device 300 except here a playback or loopback (or reference) path or circuit 718 has been added to analyze a copy of the audio output 712 being emitted at least from the same device although audio from other devices can still be present as well. Such copy is referred to as a loopback reference signal or just reference signal herein. Here, a playback unit 714 may provide audio output data or signal to be provided to the one or more speakers 716 forming the audio output 712 received by microphones 702. The emitted audio may be from an application, such as from a TTS or other application for example, that includes words spoken by a computer originated voice, and that is considered a separate program from a PA or other program to be triggered by the keyphrases such that there may be no or limited prior knowledge of what words to expect in the audio input. It will be noted that the microphones 702, pre-processing unit 704, keyphrase detection unit 706, speaker recognition unit (here speaker ID/pattern matching unit) 708, and speaker model 710 have already been described above with device 300 for the capture path when no reference path is provided, and therefore operations performed by device 300 that are the same or similar as for device 700 are already described for device 300 and do not need to be repeated here. Those operations that are added due to the addition of the reference path are described below.

The addition of the reference path 718 provides a number of options. First, the reference signal may be provided to the pre-processing unit 704 to perform acoustic echo cancellation (AEC) to remove reference signal audio from the captured audio signal. Second, since residual data may still survive the cancellation, a reference keyphrase detection unit 722 may be added in order to monitor and detect keyphrases in the reference signal. If such keyphrases are found in the reference signal, the capture path keyphrase detection unit 706 may be disabled, or its output ignored, as activated by control 707, so that triggering of actions by the keyphrases in the captured audio signal are omitted when they correspond to those in the reference signal. This operation can be performed either before or after the speaker recognition is applied to the captured audio signal as described below.

By yet another option, reference keyphrase detection unit 722 may provide a reference score, and a confidence score is determined that factors both the reference score and the speaker score. The confidence score is compared to one or more criteria to determine if the action to be triggered should be omitted. This confidence score option can be used alone or combined with the first option where the reference keyphrase detection and/or the speaker recognition may first make a sole determination. Once the reference score is received from the reference keyphrase detection unit 722, the speaker recognition unit 708 may perform the rest of the operations as well as indicating the result to the control 707. These options are explained with the process 800 (FIGS. 8A-8B).

Finally, an option is provided to perform pattern matching explained with device 900 (FIG. 9) and matched between the reference signal and the captured audio signal, and by one form, by comparing speaker recognition feature representations for both signals. The details are provided below. The speaker ID/pattern matching unit 708 may perform these operations as well.

It will be appreciated that as with device 300, the speaker recognition and keyphrase detection units 704, 706, 708, 710, and 722 of device 700, as well as the application providing data for the playback unit 714, may be entirely or partly remote from device 700 and transmit data back and forth from device 700 over a network, such as the internet and to a cloud or server that operates the units. Thus, when device 300 or device 700 are described as having a unit, or the unit being on the device, this also includes the device being communicatively coupled to such units when the software or hardware to operate such units (or parts of the unit) are physically remote from the device.

Figure 8A:
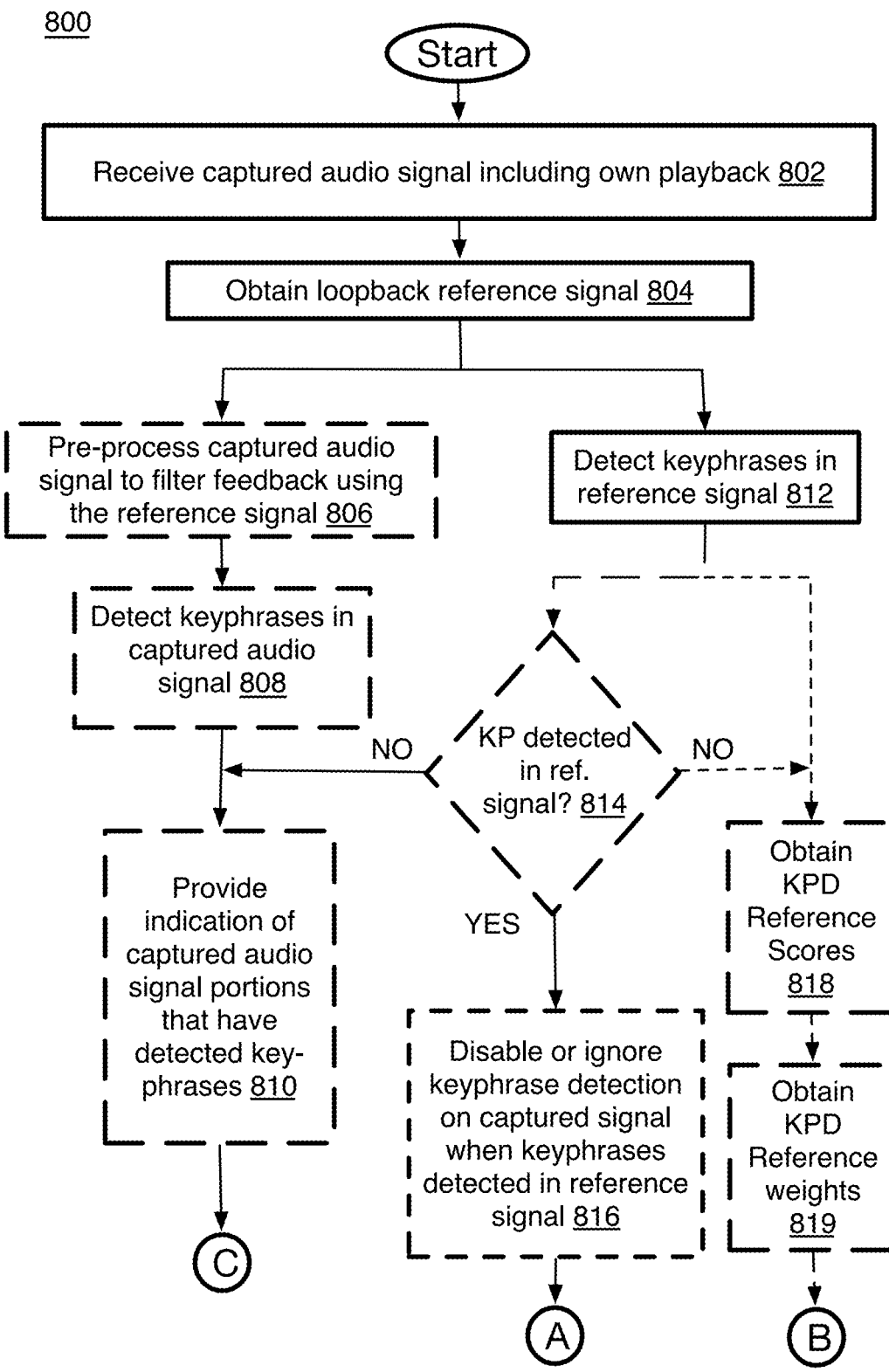

Referring to FIGS. 8A-8B, an example process 800 of keyphrase rejection using speaker recognition and a reference signal is arranged in accordance with at least some implementations of the present disclosure. Process 800 may include one or more operations 802-834 generally numbered evenly. Process 800 or portions thereof may be performed by a device or system (e.g., systems/devices 300, 400, 700, 900, 1000, or any other device or system discussed herein).

Process 800 may include "Receive captured audio signal including own playback" 802, and as explained above, where the device output is included in the device audio input and may include words spoken by a computer originated voice such as from a TTS application or other application such as a media player or other voice emitting program. The sounds which are played back through a loudspeaker come back to the pipeline via acoustic feedback and are present in the captured audio.

Process 800 may include "Obtain loopback reference signal" 804, and this may include receiving a split copy of the audio output formed by the playback unit and being provided to one or more speakers. It will be understood that the audio data generated by a playback unit may be initiated and processed remote from the current device emitting the audio data and capturing the emitted audio. Thus, for example, a TTS engine may be located on a remote server and communicate via a cloud and/or the internet to the current device to provide data to playback unit to form the audio output and loopback reference signal.

The following are a number of different options for performing process 800, but other variations for keyphrase rejection using speaker recognition may be used as well.

Option 1: Echo Cancellation Only with Speaker Recognition

Process 800 may include "Pre-process captured audio signal to filter feedback using the reference signal" 806. Optionally, the reference signal may be passed to the pre-processing unit in which a suitable algorithm for reducing the feedback is implemented. This may include Acoustic Echo Cancellation (AEC) based on adaptive filtration. A cleaner captured audio signal with less noise and with much of the reference signal removed from the captured audio signal can now be provided to the captured keyphrase detection unit. As mentioned, residual data from the reference signal still may be present in the captured audio signal.

For this option, process 500 is adopted here in operations 808 and 810 so that speaker recognition is only applied to detected keyphrases in the captured audio signal, and this may be implemented when a binary speaker recognition decision is desired coupled with the pre-processing AEC. In this option, the reference signal is only used for the pre-processing. After the pre-processing, this option may include operations "Detect keyphrases in captured audio signal" 808, and "Provide indication of captured audio signal portions that have detected keyphrases" 810. The process 800 then continues with the speaker recognition operations 820 to 824, and specifically "Perform speaker recognition on captured audio signal portions" 820, and as described above, and which may include "Perform feature extraction" 822, and "Detect whether a speaker of the captured audio signal portions is computer originated voice by performing model scoring at least partly based on at least one pre-enrolled computer originated voice" 824, also as described above to result in a speaker recognition decision based on a speaker score for example.

Thereafter, process 800 continues with "Disable or ignore keyphrase detection on captured audio signal when keyphrase is spoken by computer originated voice" 828 to omit the action when the keyphrase has been found to be spoken by the computer originated voice in the captured audio signal. In this case, the combined speaker-reference confidence score will not be generated. Also, it will be appreciated that this binary speaker recognition decision may be formed without first detecting the keyphrases as in process 550 (FIG. 5B).

Option 2: Reference Signal KPD Decision Preliminary or Subsequent to Binary Speaker Recognition Decision For this option, process 800 also may include "Detect keyphrases in reference signal" 812. In parallel to the speaker recognition operations, the reference signal is also processed by a keyphrase detection engine (or unit) in the reference path as disclosed in U.S. patent application Ser. No. 15/838,489 (citation above). If the keyphrase is spotted in the reference signal, the detection on the capture path is temporarily disabled. This involves feature extraction from the reference signal and providing the features to a neural network similar to the ASR operations as used with the KPD operations applied to the captured audio signal. For this option, the result is a comparison of a reference score to one or more criteria such as one or more thresholds to make a preliminary decision on the recognition of at least one keyphrase rather the computation of the combined confidence score.

Specifically, after the detection operations 812, process 800 may include an inquiry "KP detected in reference signal?" 814. If no keyphrase was detected in the reference signal, then speaker recognition is performed starting at operation 810 or operation 820 (depending on whether keyphrases were detected to only apply speaker recognition to the keyphrases). In either case, the process continues with speaker recognition at operation 820 as explained above for option 1 and to make a final speaker score decision. The process then continues with operation 828 to omit the action, such as waking the ASR program of a PA, when the computer originated voice is present in the captured audio signal.

Alternatively, if a keyphrase is present in the reference signal, process 800 may include "Disable or ignore keyphrase detection on captured signal when keyphrases detected in reference signal" 816, and in order to omit the action.

Option 3: Confidence Score (or Final Reference Signal Keyphrase Detection Score)

Here, the speaker recognition produces continuous numeric scores to contribute to confidence scores (or final reference signal keyphrase detection score), and in this case, combined confidence scores that factor both the speaker score and a reference signal score.

For this option, after the initial operations 802 and 804 as well as the keyphrase detection applied to the reference signal (operation 812), process 800 may include "Obtain KPD reference scores" 818, and particularly keyphrase engine scores $score_{KP}$ for utterances determined by the reference keyphrase detection unit (also referred to as the keyphrase engine or self-trigger detection unit). This may be provided for each frame (or other division) to provide a continuous stream of reference scores. The reference keyphrase detection unit scores may be the same scores that the reference keyphrase detection unit uses to determine whether a keyphrase is recognized in the reference signal or could be a score computed solely for use in the confidence score, and may be computed in different ways. By one form, the reference keyphrase detection scores are computed the same way the captured keyphrase detection scores are computed, except applied to the reference signal rather than the captured signal.

Process 800 may include "Obtain KPD reference weights" 819, and specifically determine weights $w_{KP}$ that are determined by experimentation, and determined during model or platform tuning.

Turning to the speaker recognition side, in the option with the confidence score generation, and after initial operations 802 and 804, process 800 continues with speaker recognition operation 820 (since pre-determined keyphrases are not provided in this case thereby skipping operations 808 and 810). As mentioned, operation 820 may include the feature extraction 822 and speaker recognition operations 824, but now operation 820 also may include "Provide speaker scores" 826, and particularly, continuous speaker scores $score_{SI}$ that indicate the likelihood that an utterance was spoken by an enrolled computer originated voice on the captured audio signal. As with the reference signal KPD determination, the speaker score may be provided for each frame or other interval of frames to provide a continuous stream of speaker scores. Also, the speaker score could be a score that could be used to make a final determination, but otherwise could be calculated differently or modified to be used in the confidence score.

Process 800 may include "Provide speaker weights" 827, and specifically to determine weights $w_{SI}$ that are determined by experimentation.

Next, process 800 may include "Determine confidence scores" 830. The both continuous speaker scores $score_{SI}$ and the continuous reference scores $score_{KP}$ are factored in the confidence score for the reference KPD unit. The final reference signal KP detection score (or just confidence score) $\widetilde{score}_{KP}$ of the reference KPD unit is computed as the weighted sum:

$$\widetilde{score}_{KP} = w_{KP} \cdot score_{KP} + w_{SI} \cdot score_{SI} \quad (1)$$

with the weights $w_{KP}$, and $w_{SI}$. By other options, the scores may be summed without the weights.

The generation of the continuous speaker scores and reference scores may be synchronized such as by a clock, and by one form at 100 scores per second when frames are shifted by 10 ms for example, so that scores of the same utterance from the reference signal and captured audio signal are added together.

As to the speaker models for the continuous speaker recognition used to form the confidence scores, the speaker recognition unit could generate the speaker models on-the-fly, and by one form by using the available data of the reference stream. Otherwise, offline generated speaker models can be used.

Process 800 may include "Disable or ignore keyphrase detection on captured audio signal when confidence scores meet one or more criteria" 832, and when the confidence score is over or under one or more thresholds. The thresholds may be fixed or vary as mentioned, and for any of the implementations herein, and may be predetermined or modified on the fly, also for any of the implementations herein. Otherwise, this operation results in omitting the action, such as waking the PA by disabling the keyphrase detection or ignoring the output of the keyphrase detection.

Option 4: Combination of Options 2 and 3

It will be understood that process 800 also can provide the reference signal KPD as an initial determination, and then if no keyphrase is found on the reference signal, then the confidence score is determined by using the continuous speaker and reference signal scores as described above. In this case, after the KPD unit of the reference signal decides, the inquiry 814 is performed. If a keyphrase is detected in the reference signal, then the process continues with operation 816 to omit the action as described with option 2. If no keyphrase is detected in the reference signal, the process continues with both speaker operation 820 and reference operation 818 to then generate a confidence score as described above for option 3.

It will be understood that other variations could exist such as using the speaker recognition as a preliminary determination and then computing the confidence score upon a negative result on the preliminary operation.

For all of the options, process 800 may include "Repeat while signal is being received" 834, and this refers to repeating the analysis of the signals as long as the signals are being received. This may include continuously monitoring the signals when the confidence scores are being generated, but could also or alternatively include limiting the speaker recognition on captured audio signal portions that have been found to have a keyphrase by the captured audio signal KPD for example.

To summarize, since the speaker recognition unit is coupled with the captured audio signal keyphrase detector, the speaker recognition unit can use a text-dependent case; the system need only verify that an utterance has been produced by the device or not. In that use case, the keyphrase detection unit identifies the segment when the keyphrase has been detected, passes that information to the speaker ID engine, and the speaker ID engine produces a result (in form of one or more binary decisions or scores).

However, for the confidence score approach for generating a continuous speaker score by the speaker recognition unit (speaker ID engine) for factoring the speaker score with the reference score of the reference KPD unit, a text-independent solution may be superior since the speaker recognition would not only be used to form a final verification while the capture KPD unit detected a keyphrase in a captured audio signal, but thereafter the speaker recognition unit could continuously listen until the end of the captured audio signal.

Figure 9:
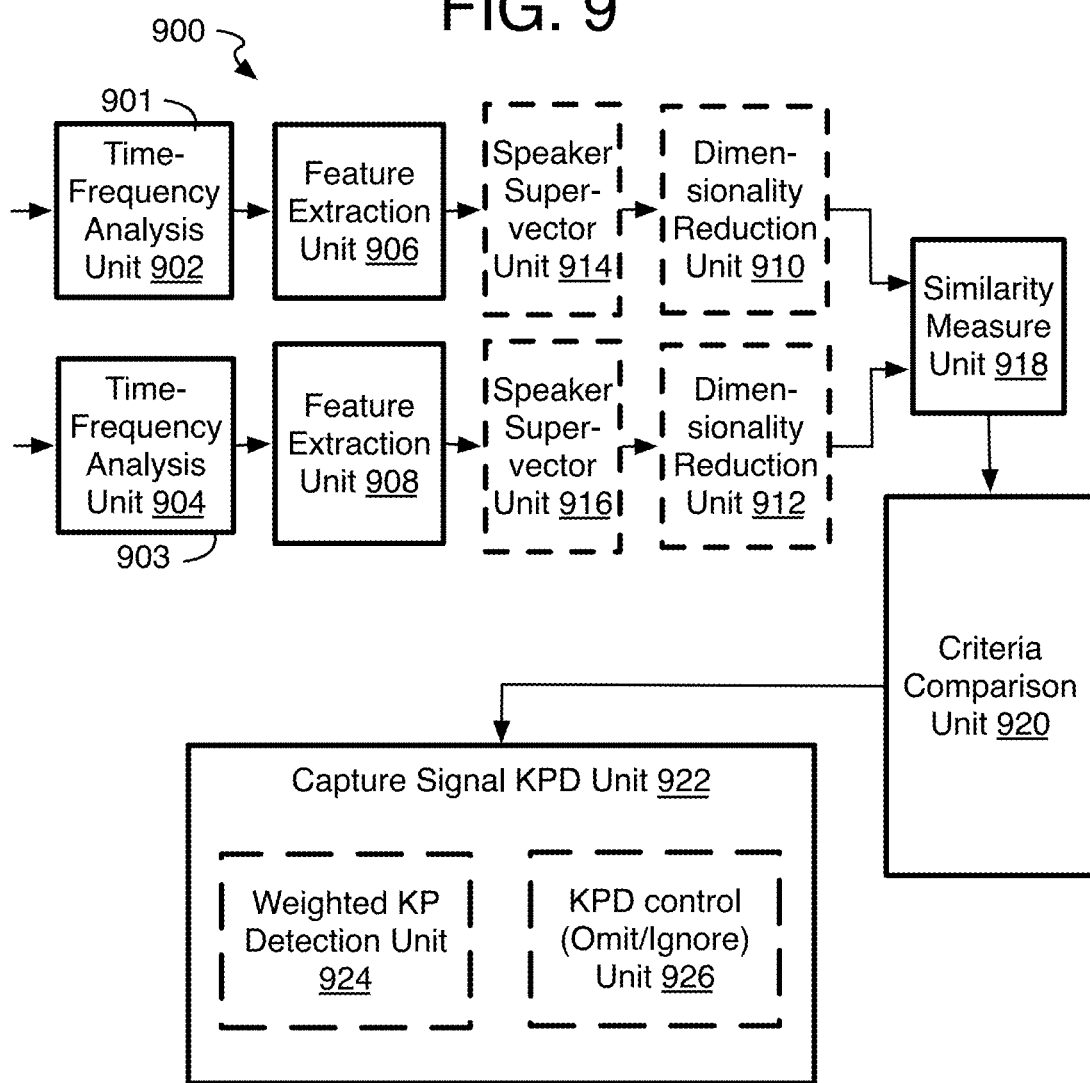
FIG. 9 is a schematic diagram of an example audio keyphrase activation system with false keyphrase rejection with pattern matching according to at least one of the implementations described herein.

Referring to FIG. 9, as an alternative to determining a confidence score based on the combination of a speaker score obtained for the captured audio signal and a reference KPD score obtained for the reference signal, a direct pattern matching system 900 can be used instead. The pattern matching involves a direct comparison between the reference signal and the captured signal. The details are as follows.

The system 900 is shown with units for a reference or loopback path 901 and units for a capture path 903. The system 900 may have reference and captured time-frequency analysis units 902 and 904. Both the captured audio signal and the reference audio signal are analyzed in the frequency domain, and typically with short-term Fourier transform STFT, or digital wavelet transform DWT. In the frequency-domain, features can be extracted from the signals that describe the characteristic points in a frequency-domain spectrum that shows the location of spectral peaks and valleys of the signals. Such features are known to be noise robust and well preserved even if the captured signal is heavily degraded thereby increasing the accuracy of the feature extraction.

Thus, the system 900 also may have reference and captured feature extraction units 906 and 908. The features are extracted from both signals resulting in feature vectors (or other representations) that may include MFCC vector elements, or other known coefficient types.

Optionally, the system 900 may have reference and captured dimensionality reduction units 910 and 912 to then reduce the size of the feature vector. Known methods such as Principal Component Analysis (PCA), Non-Negative Matrix Factorization (NMF) or hash functions can be used to that end.

Next, a similarity measure unit 918 computes the similarity measure between the features of the captured audio signal and the reference signal. It can be achieved using methods such as cosine distance scoring, dynamic time warping, vector quantization, or similar algorithms.

The similarity measure is compared with the threshold value to decide on the result at a criteria comparison unit 920. Indication of the decision may be passed to a KPD control (omit/ignore) unit 926 to omit or ignore KPD results as described above for the other implementations herein. Otherwise, the similarity score can alternatively be provided to the capture signal KPD unit 922 to serve as a weight for the KPD unit. This involves multiplying or adding the pattern matching score (or negative of the patterning score) to a final KPD score, and comparing that result to a threshold.

By another approach, pattern matching alternatively, or additionally, can be achieved by applying speaker recognition to both the captured and reference signals. Thus, system 900 may have reference and captured speaker super-vector units 914 and 916. Features are extracted on the capture path and on the reference audio path. The supervector generation is then performed as with speaker recognition process 600 (FIG. 6), and this is performed for each of the captured and reference signals separately which results in two supervectors that can be compared in terms of similarity by cosine distance or other comparison methods for example. It will be understood that the speaker recognition for both signals may use the same speaker and/or UBM models to determine the similarities. Techniques for pattern matching are disclosed in Wang, A, "An Industrial Strength Audio Search Algorithm", 4$^{th}$ Int. Conf. on Music Information Retrieval, Baltimore (2003).

Also, the dimensionality reduction units 914 and 916 may reduce the supervectors by an i-vector approach or singular-value decomposition (SVD) or the like.

The final similarity score can then be thresholded, or, as described above, be used as a confidence score to control the capture KPD detection unit 922 by control 926, or as a weight for KPD detection on the captured audio signal by the weighted KP detection unit 924, or both. The supervectors may be calculated for a similarity score at discrete time stamps (e.g., every N seconds) and used for comparison, or their calculation can be triggered by an additional speech-nonspeech classifier, voice activity detector, or even the KPD detection unit itself.

In order to prove the robustness, an experiment was performed on a home smartspeaker using a loopback reference signal and by provoking 25 Alexa replies from the device in various noise conditions and from audio emitted from a TTS application specifically setup to emit the same PA voice used on the smartspeaker. The experiment used three of these utterances in clean condition for enrollment, while the remaining 22 were used as an evaluation corpus. The results are shown in Table 1.

TABLE 1

WoV detection rate with and without Speaker Recognition for detection of TTS-samples of the phrase "Alexa" in the same PA voice

| KPD detection rate without Speaker Recognition. | | KPD detection rate with Speaker Recognition. | |
|---|---|---|---|
| 86.36% | 19/22 | 4.55% | 1/22 |

The capture audio signal KPD engine detects 86.36% of all utterances as correct "Alexa" and would have initiated a reply by the personal assistant for these false self-triggers that should not trigger the awakening of the PA. When the speaker recognition was included to omit the waking action upon recognition of a computer originated voice, this resulted in only one detection; the remaining 21 utterances have been correctly accepted as Alexa phrases produced by the TTS set to use the same PA voice.

Figure 10:
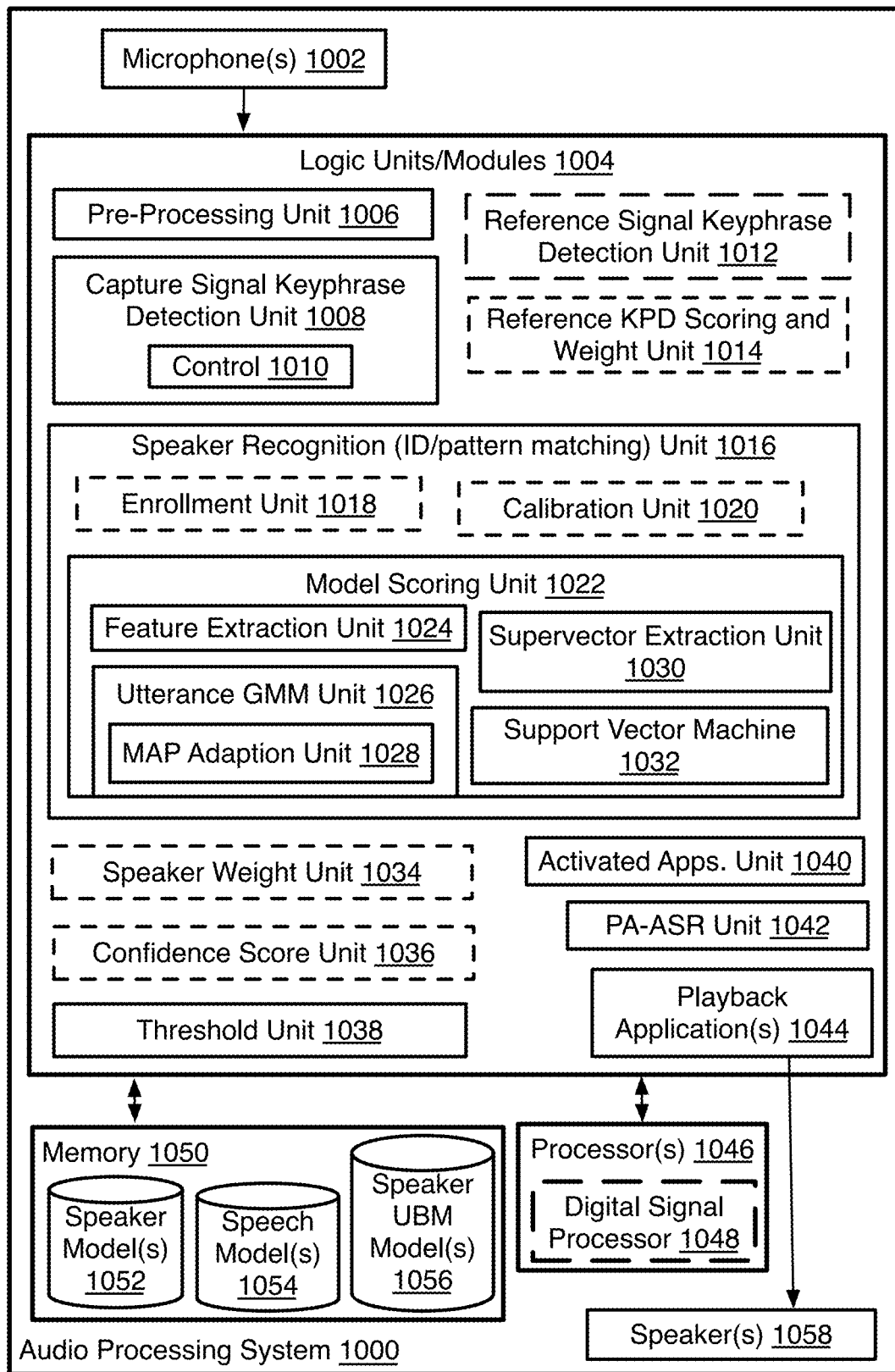
FIG. 10 is an illustrative diagram of an example system for providing the automatic speaker recognition activation described herein.

Referring to FIG. 10, an example audio processing system 1000 for providing keyphrase rejection using speaker recognition is arranged in accordance with at least some implementations of the present disclosure. System 1000 may include at least one microphone 1002, logic units or logic modules 1004, memory 1050, one or more processors 1046, and one or more speakers 1058. The system may be considered a smartspeaker or may have a smartspeaker to implement all or some of the logic units described herein. Otherwise, the system 1000 may have or be any of the other devices mentioned herein or any other device that provides the audio capabilities described herein.

To perform the keyphrase detection described herein, such as WoV applications, the logic units/modules 1004 may have a pre-processing unit 1006, a capture signal keyphrase detection unit 1008 with a control 1010 (similar to control 307 or 707) to perform the triggering of actions or waking of a PA as described above. The logic units/modules 1004 also may optionally include a reference signal keyphrase detection unit 1012 when a reference signal is providing playback for analysis as described above.

The logic units/modules 1004 also may include a speaker recognition (ID/pattern matching) unit 1016. This unit may include an enrollment unit 1018, a calibration unit 1020, and a model scoring unit 1022. The model scoring unit 1022 may include a feature extraction unit 1024, an utterance GMM Unit 1026 with a MAP adaption unit 1028, a supervector extraction unit 1030, and a support vector machine 1032. For confidence score determination, the logic units/modules 1004 also may have a reference KPD scoring and weight unit 1014, a speaker weight unit 1034, and a confidence score unit 1036. A threshold unit 1038 also may be provided, as well as a PA-ASR unit 1042, activated applications unit 1040 that has applications that could be activated or wakened instead of, or in addition to, the PA, and a playback application(s) unit 1044 that provides the audio to be output by speaker(s) 1058.

At least one processor 1046 may or may not be a central processor, and may be or have a digital signal processor 1048 that may include any number and type of processing units that may perform the operations as discussed herein. Such operations may be implemented via software, firmware, hardware or a combination thereof. For example, digital signal processor 1048 may include circuitry dedicated to manipulating data obtained from memory 1050 or dedicated memory. Furthermore, processor(s) 1046 may include any number and type of processing units or modules that may provide control and other high level functions for system 1000 as well as the operations as discussed herein. In the illustrated example, system 1000 may be configured to perform voice activation (WoV) and/or speaker recognition as disclosed herein.

Memory 1050 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1050 may be implemented at least in part by cache memory. By one form, one or more memories may store one or more speaker models 1052, one or more speech models 1054, and/or one or more speaker UBM models 1056 for use as described above.

It will be understood that the system 1000 may not have all parts of all units and models on the same physical device, such as a smartspeaker, and any of the units described as included on a device or system may be communicatively connected to the device but may be partly or entirely physically located remotely from the device.

The operation of the components of system 1000 are clear from the description of the systems and methods already described above. Thus, the names of the components of system 1000 are similar to the name or functions described above, so that the name of the components reveal which functions are performed by that component.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" or "unit" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
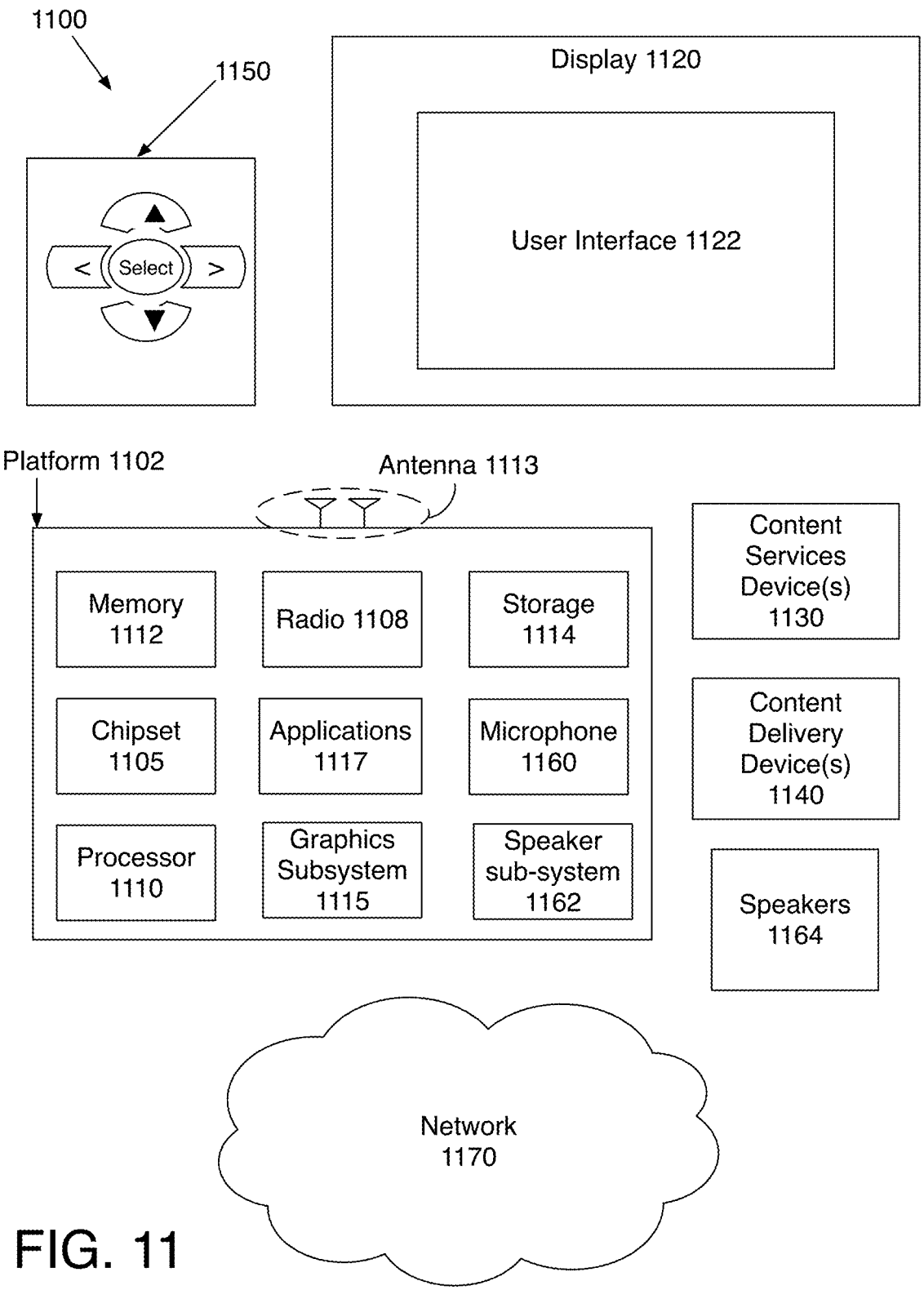
FIG. 11 is an illustrative diagram of an example system.

Referring to FIG. 11, an example system 1100 is arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartspeaker, smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. As shown, in some examples, system 1100 may include microphone 1160 (or 302 (FIG. 3) or 702 (FIG. 7)) implemented via platform 1102. Platform 1102 may receive input speech via microphone 1160 as discussed herein and provide audio output over one or more speakers 1164. A navigation controller 1150 including one or more navigation features may be used to interact with, for example, platform 1102 and/or display 1120. Each of these components is described in greater detail below.

In various implementations, system 1100 may provide speaker recognition for a device as described. In other implementations, system 1100 may provide for keyphrase rejection by using speaker recognition during WoV operations as discussed herein. Training for speaker recognition models may be performed offline prior to speaker recognition.

In various implementations, platform 1102 may include any combination of a chipset 1105, processor 1110, memory 1112, antenna 1113, storage 1114, graphics subsystem 1115, speaker sub-system 1162, applications 1116 and/or radio 11112. Chipset 1105 may provide intercommunication among processor 1110, memory 1112, storage 1114, graphics subsystem 1115, applications 1116 and/or radio 1108. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x126 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

A speaker sub-system 1162 may perform processing of audio for emission by the device over one or more speakers included in the sub-system. An analog or digital interface may be used to communicatively couple speaker sub-system 1162 and speakers 1164. Speaker subsystem 1162 may be integrated into processor 1110 or chipset 1115. In some implementations, speaker subsystem 1162 may be a stand-alone device communicatively coupled to chipset 1105.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implements, the functions may be implemented in a consumer electronics device.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1115. In some implementations, graphics subsystem 1115 may be a stand-alone device communicatively coupled to chipset 1105.

Radio 1108 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1108 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1170 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1170 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various implements, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various implements, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various implements, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implements, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implements, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implements, however, are not limited to the elements or in the context shown or described in FIG. 11.

Figure 12:
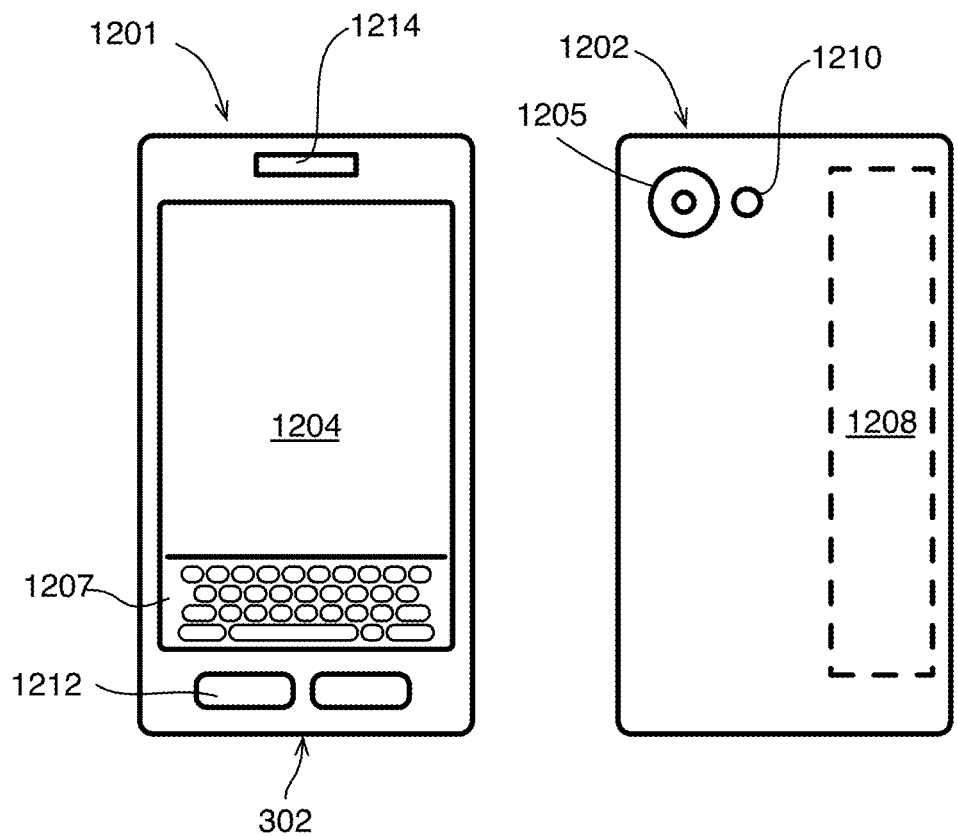
FIG. 12 illustrates an example device, all arranged in accordance with at least some implementations of the present disclosure.

Referring to FIG. 12, systems 1000 and 1100 may be embodied in varying physical styles or form factors. A small form factor device 1200 is arranged in accordance with at least some implementations of the present disclosure such that system 1000 or 1100 may be implemented via device 1200. In other examples, other devices or systems, or portions thereof may be implemented via device 1200. In various implements, for example, device 1200 may be implemented as a mobile computing device having wireless capabilities. A mobile computing device may refer to any device having a processing system and a mobile power source or supply, such as one or more batteries, for example.

Examples of a mobile computing device may include a smartspeaker, personal computer (PC), laptop computer, ultra-laptop computer, tablet, phablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various implements, for example, a mobile computing device may be implemented as a smart phone capable of executing computer applications, as well as voice communications and/or data communications. Although some implements may be described with a mobile computing device implemented as a smart phone by way of example, it may be appreciated that other implements may be implemented using other wireless mobile computing devices as well. The implements are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of one or more microphones 302, and/or may be digitized by an audio processing, or voice recognition, device. The device 1200 also may have one or more speakers 1214 as well. As shown, device 1200 may include a camera 1205 (e.g., including a lens, an aperture, and an imaging sensor) and a flash 1210 integrated into back 1202 (or elsewhere) of device 1200.

Various implements may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implement is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implement may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of false keyphrase rejection comprises receiving a captured audio signal of sound captured from at least one microphone; detecting whether or not the captured audio signal includes speech spoken by at least one computer originated voice; and omitting an action to be triggered when one or more keyphrases are present in the captured audio signal, and omitting the action at least partly depending on whether the at least one computer originated voice was recognized in the captured audio signal.

Otherwise, the method may comprise either (A) analyzing the captured audio signal to detect one or more keyphrases; and analyzing the portions of the captured audio signal with keyphrases rather than the non-keyphrase parts of the captured audio signal to determine whether or not the one or more keyphrases were spoken by the computer originated voice; or (B) analyzing the captured audio signal to recognize the computer originated voice as the speaker of the captured audio signal regardless of whether one or more keyphrases are spoken in the speech; and omitting the action because the computer originated voice is recognized as the speaker of the speech. The method also comprises either (1) ignoring the output of a keyphrase detector analyzing the captured audio signal because the computer originated voice is recognized as the speaker of the captured audio signal; or (2) disabling a keyphrase detector so that the keyphrase detector does not analyze a captured audio signal spoken by a recognized one of the at least one computer originated voices; the method comprising analyzing a loopback reference signal to determine a reference score indicating whether the loopback signal is likely to include one or more keyphrases; and generating a confidence score factoring both the reference score and a speaker score indicating a likelihood that the captured audio signal was spoken by the at least one computer originated voice; at least one of: (a) determining to omit the action because the captured audio signal was spoken by the at least one computer originated voice after analysis of the loopback reference signal did not find a keyphrase in the loopback reference signal, and (b) determining to omit the action when the loopback reference signal is found to have the one or more keyphrases after it was determined the computer originated voice was likely not the speaker of the captured audio signal. The method may alternatively comprise wherein the detecting comprises pattern matching between a loopback reference signal and the captured audio signal using speaker recognition feature representations to perform the matching; wherein the captured audio signal comprises at least one non-local computer originated voice audibly emitted from at least one non-local audio device separate from a current audio device having microphones to form the captured audio signal, wherein the non-local computer originated voice is recognizable by speaker recognition initiated at the current device. The method comprises enrolling the at least one computer originated voice in at least one speaker model comprising emitting the computer originated voice speaking speech over one or more loudspeakers within a hearing range of a computing device that processes audio data to add the at least one computer originated voice to the at least one speaker model; permitting a user to calibrate the keyphrase rejection comprising receiving sound of the one or more keyphrases on a computing device; and processing the sound to enroll feature representations generated by using the sound and enrolling the feature representations on a speaker model, wherein the action is waking an automatic speech recognition application.

By yet another implementation, an audio processing device comprises at least one microphone; a capture path receiving captured audio signals of sound captured by the at least one microphone; at least one processor communicatively coupled to the capture path; a speaker recognition unit operated by detecting whether or not the captured audio signal includes speech spoken by at least one computer originated voice; and a keyphrase detection unit to be operated by omitting an action to be triggered when one or more keyphrases are present in the captured audio signal, and omitting the action at least partly depending on whether the at least one computer originated voice was recognized in the captured audio signal.

By another example, the device comprises a reference loopback path to provide a reference signal of output from the audio device; and a reference keyphrase detection unit to indicate whether the reference signal is likely to include one or more keyphrases; wherein the reference keyphrase unit is to provide a reference score to indicate whether the reference signal is likely to include one or more keyphrases; wherein the speaker recognition unit is to generate a speaker score indicating a likelihood that the captured audio signal was spoken by the at least one computer originated voice; and the device comprising a confidence score unit factoring both the reference score and the speaker score to generate a confidence score; at least one weight unit that generates both weights of the reference scores and weights of the speaker scores both to be factored in the confidence score.

Alternatively, the device may include at least one of: (1) wherein the keyphrase detection unit is to omit the action when the reference keyphrase detection unit detects one or more keyphrases in the reference signal; and the speaker recognition unit is arranged to detect a computer originated voice in the captured audio signal after the reference keyphrase detection unit does not find the one or more keyphrases in the reference signal; (2) wherein the keyphrase detection unit is to omit the action when the reference keyphrase detection unit detects one or more keyphrases in the reference signal after the speaker recognition unit does not find the one or more computer originated voices in the captured audio signal; and (3) where the speaker recognition unit generates speaker recognition feature representations of both the captured audio signal and the reference signal, and the device comprising a pattern matching unit to pattern match between the loopback reference signal and the captured audio signal using the speaker recognition feature representations to perform the matching.

By one approach, at least one machine readable medium comprising a plurality of instructions that, in response to being executed on a computing device, cause the computing device to operate by: receiving a captured audio signal of sound captured from at least one microphone; detecting whether or not the captured audio signal includes speech spoken by at least one computer originated voice; and omitting an action to be triggered when one or more keyphrases are present in the captured audio signal, and omitting the action at least partly depending on whether the at least one computer originated voice was recognized in the captured audio signal.

By another approach, the instructions cause the computing device to operate by wherein the instructions cause the computing device to operate by pattern matching between a loopback reference signal and the captured audio signal comprising using speaker recognition feature representations of both the reference and captured audio signals to perform the matching; wherein the instructions cause the computing device to operate by performing the pattern matching by using the same speaker models to perform the speaker recognition on both the reference and captured audio signals; wherein the instructions cause the computing device to operate by generating a similarity measure from the pattern matching; and comparing the measure to at least one criteria to form a final determination as to whether the captured audio signal was spoken by the computer originated voice; wherein the instructions cause the computing device to operate by generating a similarity measure from the pattern matching; and using the similarity measure as a weight to determine whether a keyphrase is detected in the captured audio signal. By another form, the detecting comprises generating a speaker score; and the instructions cause the computing device to operate by: detecting whether or not one or more keyphrases are in a loopback reference signal of sound output from the same device forming the captured audio signal, the detecting comprising generating a reference score and omitting the action when the one or more keyphrases are found in the loopback reference signal; generating a confidence score by factoring both the reference score and the speaker score; and using the confidence score to decide whether the action should be omitted when the one or more keyphrases were not initially detected in the loopback reference signal by the detecting applied to the loopback reference signal.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of audio processing comprising:
    receiving a captured audio signal of speech from at least one microphone and that is prearranged to trigger an action;
    detecting whether or not at least part of the speech is spoken by at least one computer originated voice; and
    omitting the triggering of the action if the computer originated voice is detected in the speech.

2. The method of claim 1 comprising analyzing the captured audio signal to detect one or more keyphrases; and analyzing portions of the captured audio signal with keyphrases rather than non-keyphrase parts of the captured audio signal to determine whether or not the one or more keyphrases were spoken by the computer originated voice.

3. The method of claim 1 comprising analyzing the captured audio signal to recognize the computer originated voice as a speaker of the captured audio signal regardless of whether one or more keyphrases are spoken in the speech; and omitting the action because the computer originated voice is recognized as the speaker of the speech.

4. The method of claim 1 comprising ignoring output of a keyphrase detector analyzing the captured audio signal because the computer originated voice is recognized as a speaker of the captured audio signal.

5. The method of claim 1 comprising disabling a keyphrase detector so that the keyphrase detector does not analyze a captured audio signal spoken by a recognized one of the at least one computer originated voices.

6. The method of claim 1 comprising analyzing a loopback reference signal to determine a reference score indicating whether the loopback signal is likely to include one or more keyphrases; and generating a confidence score factoring both the reference score and a speaker score indicating a likelihood that the captured audio signal was spoken by the at least one computer originated voice.

7. The method of claim 1 comprising analyzing a loopback reference signal to determine a reference score indicating whether the loopback signal is likely to include one or more keyphrases; and at least one of:
 (a) determining to omit the action because the captured audio signal was spoken by the at least one computer originated voice after analysis of the loopback reference signal did not find a keyphrase in the loopback reference signal, and
 (b) determining to omit the action when the loopback reference signal is found to have the one or more keyphrases after it was determined the computer originated voice was likely not a speaker of the captured audio signal.

8. The method of claim 1 wherein the detecting comprises pattern matching between a loopback reference signal and the captured audio signal using speaker recognition feature representations to perform the matching.

9. The method of claim 1 wherein the captured audio signal comprises at least one non-local computer originated voice audibly emitted from at least one non-local audio device separate from a current audio device having microphones to form the captured audio signal, wherein the non-local computer originated voice is recognizable by speaker recognition initiated at the current device.

10. The method of claim 1 comprising enrolling the at least one computer originated voice in at least one speaker model comprising emitting the computer originated voice speaking speech over one or more loudspeakers within a hearing range of a computing device that processes audio data to add the at least one computer originated voice to the at least one speaker model.

11. The method of claim 1 comprising permitting a user to calibrate keyphrase rejection comprising receiving sound of one or more keyphrases on a computing device; and processing the sound to enroll feature representations generated by using the sound and enrolling the feature representations on a speaker model.

12. The method of claim 1 wherein the action is waking an automatic speech recognition application.

13. A computer-implemented system comprising:
 memory storing a captured audio signal of speech from at least one microphone and that is prearranged to trigger an action; and
 at least one processor communicatively coupled to the memory and being arranged to operate by:
  detecting whether or not at least part of the speech is spoken by at least one computer originated voice; and
  omitting the triggering of the action if the computer originated voice is detected in the speech.

14. The system of claim 13 wherein the at least one processor is arranged to operate by receiving a reference signal of audio output on a reference loopback path; and determining whether or not the reference signal is likely to include one or more keyphrases.

15. The system of claim 14 wherein the determining comprises providing a reference score to indicate whether the reference signal is likely to include one or more keyphrases;
 wherein the detecting comprises generating a speaker score indicating a likelihood that the captured audio signal was spoken by the at least one computer originated voice; and
 wherein the omitting comprises factoring both the reference score and the speaker score to generate a confidence score.

16. The system of a claim 15 wherein the omitting comprises generating both a weight of the reference score and a weight of the speaker score both to be factored in the confidence score.

17. The system of claim 14 wherein the omitting comprises omitting the action when one or more keyphrases are detected in the reference signal; and the detecting comprises detecting whether or not a computer originated voice is in the captured audio signal after the one or more keyphrases could not be found in the reference signal.

18. The system of claim 14, wherein the omitting comprises omitting the action when one or more keyphrases are detected in the reference signal after the one or more computer originated voices are not found in the captured audio signal.

19. The system of claim 14, wherein detecting comprises generating speaker recognition feature representations of both the captured audio signal and the reference signal, and matching patterns between the loopback reference signal and the captured audio signal using the speaker recognition feature representations to perform the matching.

20. At least one non-transitory machine readable medium comprising a plurality of instructions that, in response to being executed on a computing device, cause the computing device to operate by:
 receiving a captured audio signal of speech from at least one microphone and that is prearranged to trigger an action;
 detecting whether or not at least part of the speech is spoken by at least one computer originated voice; and
 omitting the triggering of the action if the computer originated voice is detected in the speech.

21. The medium of claim 20 wherein the instructions cause the computing device to operate by pattern matching between a loopback reference signal and the captured audio signal comprising using speaker recognition feature representations of both the reference and captured audio signals to perform the matching.

22. The medium of claim 21 wherein the instructions cause the computing device to operate by performing the pattern matching by using the same speaker models to perform the speaker recognition on both the reference and captured audio signals.

23. The medium of claim 21 wherein the instructions cause the computing device to operate by generating a similarity measure from the pattern matching; and comparing the measure to at least one criteria to form a final determination as to whether the captured audio signal was spoken by the computer originated voice.

24. The medium of claim 21 wherein the instructions cause the computing device to operate by generating a similarity measure from the pattern matching; and using the similarity measure as a weight to determine whether a keyphrase is detected in the captured audio signal.

25. The medium of claim 20 wherein the detecting comprises generating a speaker score; and the instructions cause the computing device to operate by:
 detecting whether or not one or more keyphrases are in a loopback reference signal of sound output from the same device forming the captured audio signal, the detecting comprising generating a reference score and omitting the action when the one or more keyphrases are found in the loopback reference signal;

generating a confidence score by factoring both the reference score and the speaker score; and using the confidence score to decide whether the action should be omitted when the one or more keyphrases were not initially detected in the loopback reference signal by the detecting applied to the loopback reference signal.

* * * * *